US010543729B2

(12) United States Patent
Leonard

(10) Patent No.: US 10,543,729 B2
(45) Date of Patent: Jan. 28, 2020

(54) END MOUNT ASSEMBLIES AS WELL AS GAS SPRING AND DAMPER ASSEMBLIES INCLUDING SAME

(71) Applicant: Firestone Industrial Products Company, LLC, Nashville, TN (US)

(72) Inventor: Joshua R. Leonard, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/769,382

(22) PCT Filed: Oct. 31, 2016

(86) PCT No.: PCT/US2016/059699
§ 371 (c)(1),
(2) Date: Apr. 19, 2018

(87) PCT Pub. No.: WO2017/075582
PCT Pub. Date: May 4, 2017

(65) Prior Publication Data
US 2018/0304711 A1  Oct. 25, 2018

Related U.S. Application Data

(60) Provisional application No. 62/249,262, filed on Oct. 31, 2015.

(51) Int. Cl.
*B60G 11/27* (2006.01)
*B60G 15/14* (2006.01)
(Continued)

(52) U.S. Cl.
CPC .............. *B60G 11/27* (2013.01); *B60G 15/14* (2013.01); *F16F 9/057* (2013.01); *F16F 9/3214* (2013.01);
(Continued)

(58) Field of Classification Search
CPC .. B60G 15/14; B60G 2202/152; B60G 11/27; F16F 9/54; F16F 1/3732; F16F 3/3214; F16F 9/3405; F16F 2202/152
(Continued)

(56) References Cited

U.S. PATENT DOCUMENTS 4,332,397 A * 6/1982 Steger ..................... B60G 15/14
267/220
4,465,296 A * 8/1984 Shiratori .............. B60G 15/068
267/220
(Continued)

FOREIGN PATENT DOCUMENTS

DE   10 2006 033801    1/2008
EP      2 708 387      3/2014
(Continued)

OTHER PUBLICATIONS

International Search Report dated Jan. 31, 2017 for corresponding application No. PCT/US2016/059699.

*Primary Examiner* — Thomas J Williams
*Assistant Examiner* — James K Hsiao
(74) *Attorney, Agent, or Firm* — Brian D. McAlhaney; Matthew P. Dugan

(57) ABSTRACT

End mount assemblies include a mounting bracket dimensioned for securement to an end member of a gas spring and damper assembly. The end mount assembly can include an inner mounting element dimensioned for securement to an elongated damping rod of the gas spring and damper assembly. A first plurality of bushing elements can be operatively disposed between the inner mounting element and the mounting bracket. A second plurality of bushing elements can be operatively disposed between the inner mounting element and the end member. Gas spring and a damper assemblies including such an end mount assembly as well as (Continued)

suspension systems and methods of assembly are also included.

20 Claims, 35 Drawing Sheets

(51) Int. Cl.
  *F16F 9/05*    (2006.01)
  *F16F 9/32*    (2006.01)
  *F16F 9/34*    (2006.01)
  *F16F 9/54*    (2006.01)

(52) U.S. Cl.
  CPC .............. *F16F 9/3405* (2013.01); *F16F 9/54* (2013.01); *B60G 2202/152* (2013.01); *F16F 2222/126* (2013.01); *F16F 2230/0005* (2013.01); *F16F 2230/28* (2013.01); *F16F 2232/08* (2013.01); *F16F 2236/04* (2013.01); *F16F 2238/04* (2013.01)

(58) Field of Classification Search
  USPC .................................................. 267/140, 220
  See application file for complete search history.

(56) References Cited

U.S. PATENT DOCUMENTS

| | | | | |
|---|---|---|---|---|
| 4,655,438 A * | 4/1987 | Cameron | ............... | B60G 15/14 267/220 |
| 5,180,144 A * | 1/1993 | Hellyer | ................. | B60G 15/12 267/64.19 |
| 5,690,319 A * | 11/1997 | Robinson | ............... | B60G 15/14 267/64.19 |
| 6,007,061 A * | 12/1999 | Kammel | ............... | B60G 15/068 188/321.11 |
| 6,182,953 B1 * | 2/2001 | Smith | ................. | B60G 15/063 188/321.11 |
| 6,361,027 B1 * | 3/2002 | Lun | ............................ | F16F 9/54 267/122 |
| 6,422,543 B1 | 7/2002 | Fejerdy | | |
| 6,695,294 B2 | 2/2004 | Miller | | |
| 6,764,066 B2 * | 7/2004 | Graeve | ................. | B60G 13/003 188/321.11 |
| 6,908,076 B2 * | 6/2005 | Hayashi | ............... | B60G 13/003 267/153 |
| 7,347,414 B2 * | 3/2008 | Groves | ................... | B60G 3/20 267/220 |
| 8,641,051 B2 | 2/2014 | Pavuk | | |
| 9,695,901 B2 | 7/2017 | Leonard | | |
| 9,738,131 B2 | 8/2017 | Keeler | | |
| 9,770,958 B2 * | 9/2017 | Leonard | ................ | F16F 9/0472 |
| 9,809,075 B2 | 11/2017 | Bounds | | |
| 2004/0017035 A1 * | 1/2004 | Treder | ...................... | F16F 9/54 267/220 |
| 2005/0029062 A1 * | 2/2005 | Dean | ..................... | B60G 15/068 188/322.12 |
| 2005/0115785 A1 * | 6/2005 | Thomas | ................ | B60G 15/067 188/321.11 |
| 2005/0155829 A1 * | 7/2005 | Germano | ............. | B60G 13/003 188/321.11 |
| 2005/0242542 A1 * | 11/2005 | Handke | ................ | B60G 15/063 280/124.155 |
| 2006/0208404 A1 | 9/2006 | Cmich | | |
| 2006/0226586 A1 | 10/2006 | Levy | | |
| 2007/0170684 A1 * | 7/2007 | Ohkita | ................. | B60G 15/063 280/124.147 |
| 2008/0136072 A1 * | 6/2008 | Kolb | ..................... | B60G 11/28 267/140.11 |
| 2011/0115140 A1 | 5/2011 | Moulik | | |
| 2011/0140324 A1 | 6/2011 | Naber | | |
| 2012/0280441 A1 * | 11/2012 | Inoue | ....................... | F16F 1/38 267/220 |
| 2013/0207329 A1 * | 8/2013 | Leonard | ................ | B60G 11/62 267/220 |
| 2013/0328255 A1 * | 12/2013 | Geisler | ..................... | F16F 9/54 267/220 |
| 2014/0246817 A1 | 9/2014 | Bounds | | |
| 2014/0345450 A1 | 11/2014 | Leonard | | |
| 2015/0008627 A1 | 1/2015 | Leonard | | |
| 2015/0158362 A1 * | 6/2015 | Palka | ................... | B60G 15/068 267/30 |
| 2015/0217617 A1 * | 8/2015 | Leonard | ................ | B60G 11/62 280/124.16 |
| 2015/0273968 A1 * | 10/2015 | DeBruler | .............. | F16F 13/002 267/64.24 |
| 2016/0101663 A1 | 4/2016 | Leonard | | |
| 2016/0108985 A1 * | 4/2016 | Pniewski | ................ | F16F 9/057 267/64.24 |
| 2016/0121682 A1 | 5/2016 | Leonard | | |

FOREIGN PATENT DOCUMENTS

| | | |
|---|---|---|
| FR | 2 319 813 | 2/1977 |
| WO | WO 2013/181241 | 12/2013 |
| WO | WO 2014/036541 | 3/2014 |
| WO | WO 2015/065989 | 5/2015 |

\* cited by examiner

END MOUNT ASSEMBLIES AS WELL AS GAS SPRING AND DAMPER ASSEMBLIES INCLUDING SAME

BACKGROUND

The subject matter of the present disclosure broadly relates to the art of gas spring devices and, more particularly, to end mount assemblies for use in connection with components of gas spring and damper assemblies of a variety of types and kinds. Gas spring and damper assemblies including such an end mount assembly and suspension systems including one or more of such gas spring and damper assemblies as well as methods of assembly are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring elements as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Pat. No. 7,213,799. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and damper assemblies relates to the significant travel of which gas spring devices are normally capable. That is, gas spring devices are capable of being displaced between a minimum or compressed height and a maximum or extended height. In many cases, the difference in these overall heights can be substantial. In some cases, certain difficulties relating to the incorporation of dampers into gas spring devices have been associated with the aforementioned differences in overall height of gas spring devices. At one extreme, the minimum or compressed height of a gas spring device will act to limit the overall length of components that can be housed within the gas spring device. At the other extreme, any components housed within the gas spring device should remain operatively connected between the opposing end members of the gas spring device in the extended condition thereof.

Accordingly, it is desired to develop end mount assemblies for gas spring and damper assemblies as well as a suspension system including one or more of such assemblies that overcome the foregoing and/or other difficulties associated with known constructions, and/or which may otherwise advance the art of gas spring and damper devices.

BRIEF DESCRIPTION

One example of an end mount assembly in accordance with the subject matter of the present disclosure can be dimensioned to operatively secure an associated damping rod to an associated end member of an associated gas spring and damper assembly. The end mount assembly can include a mounting bracket that is dimensioned for securement to the associated end member. The mounting bracket can include a bracket wall including a mounting wall portion, an end wall portion offset from the mounting wall portion and a side wall portion extending between and operatively connecting the mounting wall portion and the end wall portion. The bracket wall can at least partially define a mounting cavity that is at least partially formed by the end wall portion and the side wall portion. An inner mounting element can be at least partially disposed within the mounting cavity. The inner mounting element can include a mounting element wall that includes a connector portion dimensioned for operative securement to the associated damping rod and a flange portion extending radially outward from along the connector portion. The flange portion can have a first side disposed toward the end wall portion of the bracket wall and a second side facing toward the associated end member. A first plurality of bushing elements can be disposed in peripherally-spaced relation to one another along the first side of the flange portion. A second plurality of bushing elements can be disposed in peripherally-spaced relation to one another along the second side of the flange portion.

Another example of an end mount assembly in accordance with the subject matter of the present disclosure can be dimensioned to operatively secure an associated damping rod to an associated end member of an associated gas spring and damper assembly. The associated end member can include an associated end member wall with an associated first end wall portion, an associated second end wall portion offset from the associated first end wall portion and an associated side wall portion extending between and operatively connecting the associated first and second end wall portions. The associated end member wall can at least partially define an associated mounting cavity that is at least partially formed by the associated second end wall portion and the associated side wall portion. An inner mounting element can be at least partially disposed within the associated mounting cavity. The inner mounting element can include a mounting element wall that includes a connector portion dimensioned for operative securement to the associated damping rod and a flange portion extending radially outward from along the connector portion. The flange portion can have a first side disposed toward the associated second end wall portion of the bracket wall and a second side facing in a direction toward the associated first end wall portion. A first plurality of bushing elements can be disposed in peripherally-spaced relation to one another along the first side of the flange portion. A second plurality of bushing elements can be disposed in peripherally-spaced relation to one another along the second side of the flange portion. In some cases, an associated structural component can extend along the associated end member and at least partially across the associated mounting cavity.

One example of a gas spring and damper assembly in accordance with the subject matter of the present disclosure can include a gas spring, a damper assembly and an end mount assembly. The gas spring can include a flexible spring member having a longitudinal axis and including a flexible wall extending longitudinally between first and second ends and peripherally about the axis to at least partially define a spring chamber. A first end member can be operatively secured to the first end of the flexible spring member such that a substantially fluid-tight seal is formed therebetween. A second end member can be disposed in spaced relation to the first end member and can be operatively secured to the second end of the flexible spring member such that a substantially fluid-tight seal is formed therebetween. The damper assembly can be operative to dissipate kinetic energy acting on the gas spring. The damper assembly can include a damper housing and a damper rod assembly operatively engaged with the damper housing for reciprocal motion relative thereto. The damper rod assembly can include an elongated damper rod. The end mount assembly can operatively connect the elongated damper rod and the first end member and permit the first and second end members to move at least one of laterally and angularly with respect to one another during extension and compression of the gas spring and damper assembly.

One example of a suspension system in accordance with the subject matter of the present disclosure can include a pressurized gas system that includes a pressurized gas source and a control device. The suspension system can also include at least one gas spring and damper assembly according to the foregoing paragraph. The at least one gas spring and damper assembly can be disposed in fluid communication with the pressurized gas source through the control device such that pressurized gas can be selectively transferred into and out of at least the spring chamber.

One example of a method of manufacturing a gas spring and damper assembly in accordance with the subject matter of the present disclosure can include providing a flexible spring member having a longitudinal axis and including a flexible wall extending longitudinally between first and second ends and peripherally about the axis to at least partially define a spring chamber. The method can also include providing a first end member and securing the first end member across the first end of the flexible spring member such that a substantially fluid-tight seal is formed therebetween. The method can further include providing a second end member and securing the second end member across the second end of the flexible spring member such that a substantially fluid-tight seal is formed therebetween. The method can also include providing a damper assembly including an elongated damper rod and providing an end mount assembly according to the foregoing paragraph. The method can further include connecting the elongated damper rod to the first end member using the end mount assembly such that upon extension and compression of the gas spring and damper assembly. The elongated damper rod can be displaceable relative to the first end member and the first and second end members are permitted to move at least one of laterally and angularly with respect to one another.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
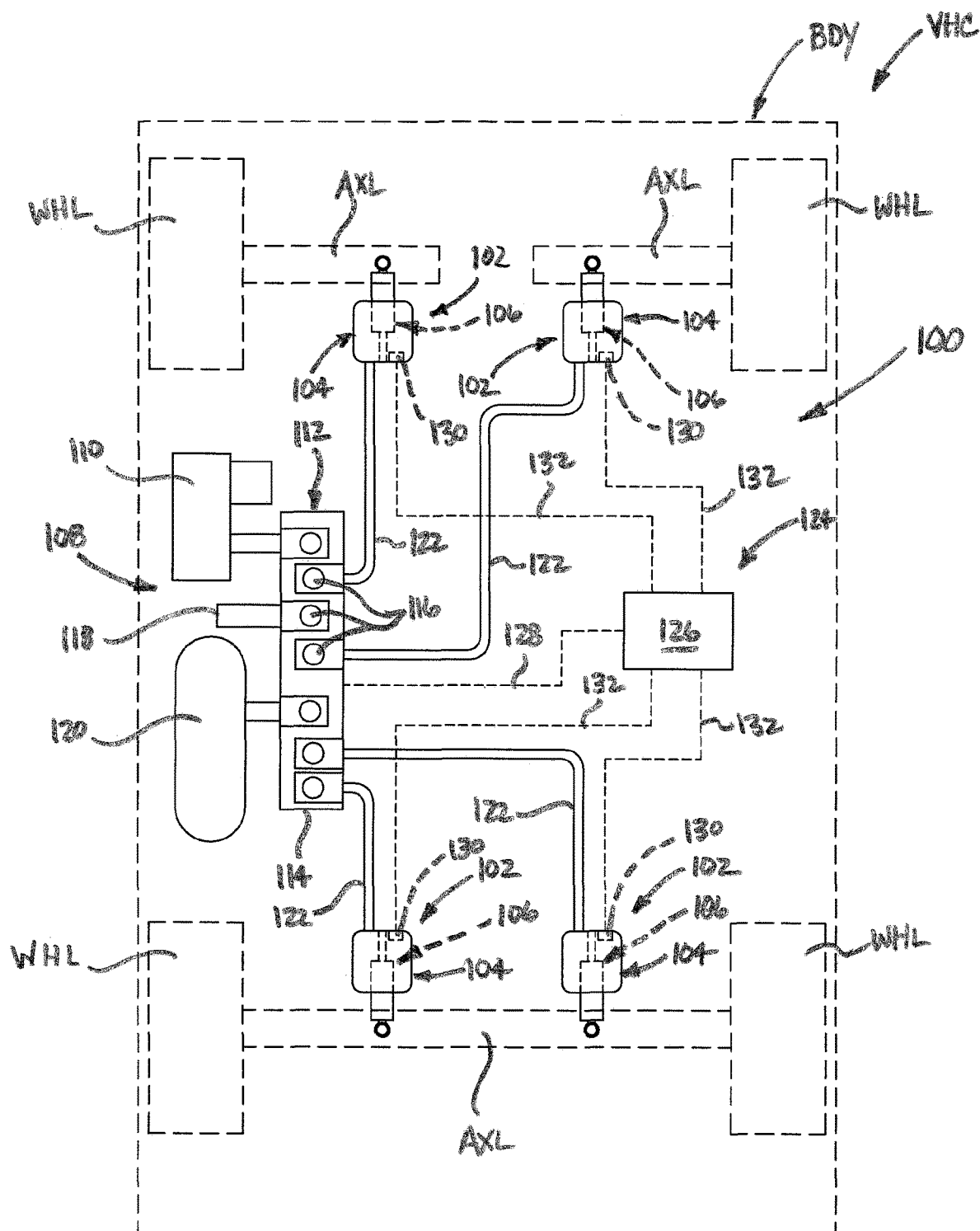
FIG. 1 is a schematic representation of one example of a suspension system of an associated vehicle that includes one or more gas spring and damper assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and damper assemblies 102 that are operatively connected between the sprung and unsprung masses of the vehicle. Depending on desired performance characteristics and/or other factors, the suspension system may, in some cases, also include damping members (not shown) of a typical construction that are provided separately from assemblies 102 and secured between the sprung and unsprung masses in a conventional manner. In a preferred arrangement, however, gas spring and damper assemblies 102 will be sized, configured and operative to provide the desired performance characteristics for the suspension system without the use of additional damping members (e.g., conventional struts or shock absorbers) that are separately provided.

In the arrangement shown in FIG. 1, suspension system 100 includes four gas spring and damper assemblies 102, one of which is disposed toward each corner of the associated vehicle adjacent a corresponding wheel WHL. However, it will be appreciated that any other suitable number of gas spring and damper assemblies could alternately be used in any other configuration and/or arrangement. As shown in FIG. 1, gas spring and damper assemblies 102 are supported between axles AXL and body BDY of associated vehicle VHC, and include a gas spring 104 and a damper 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and damper assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 and/or dampers 106 of assemblies 102 through suitable gas transfer lines 122. As such, pressurized gas can be selectively transferred into and/or out of the gas springs and/or the dampers through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the height or distance signals therefrom. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Figure 6:
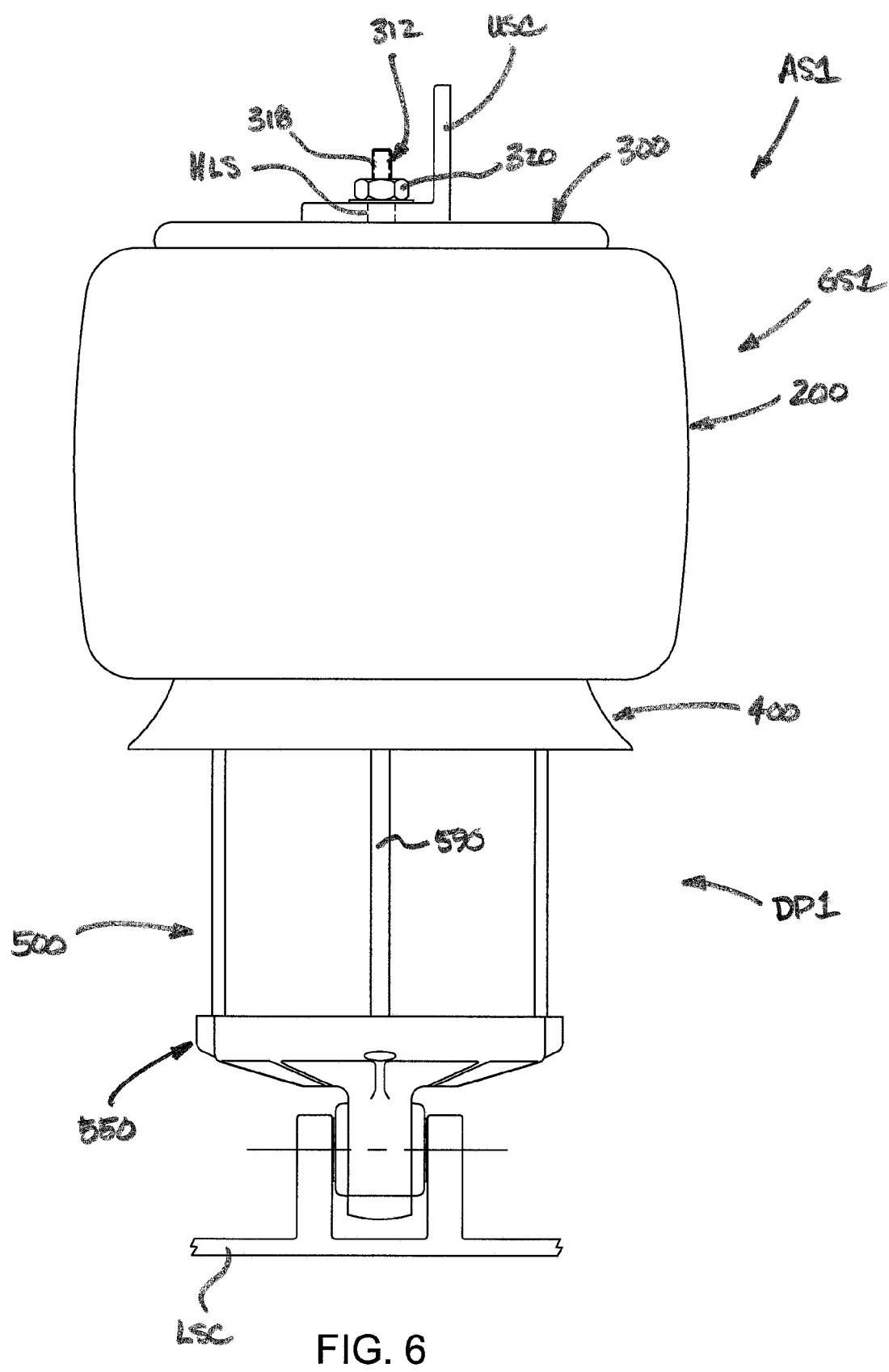
FIG. 6 is a side elevation view of the exemplary gas spring and damper assembly in FIGS. 2-5.
Figure 7:
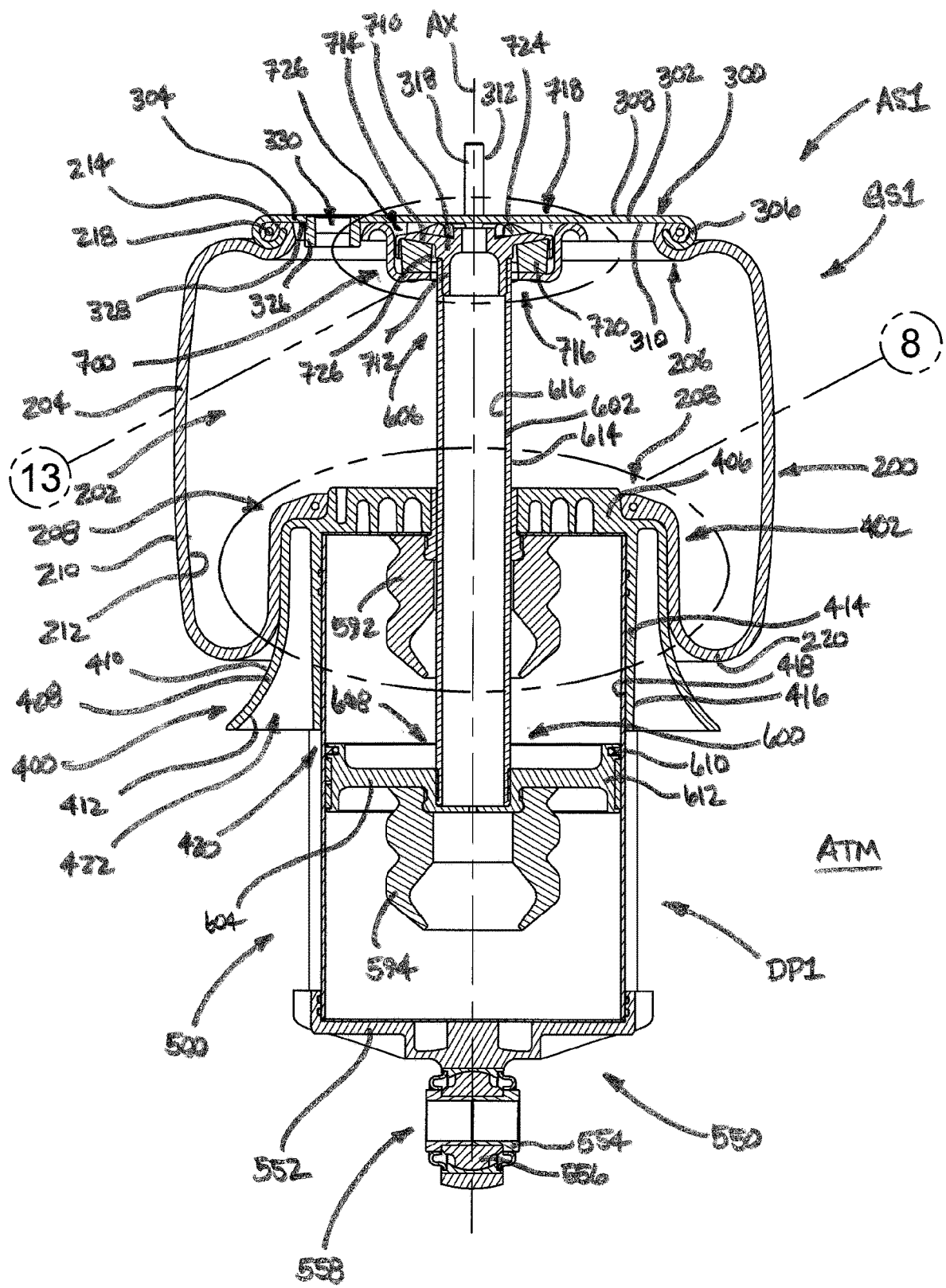
FIG. 7 is a cross-sectional side view of the exemplary gas spring and damper assembly in FIGS. 2-6 taken from along line 7-7 in FIG. 4.
Figure 8:
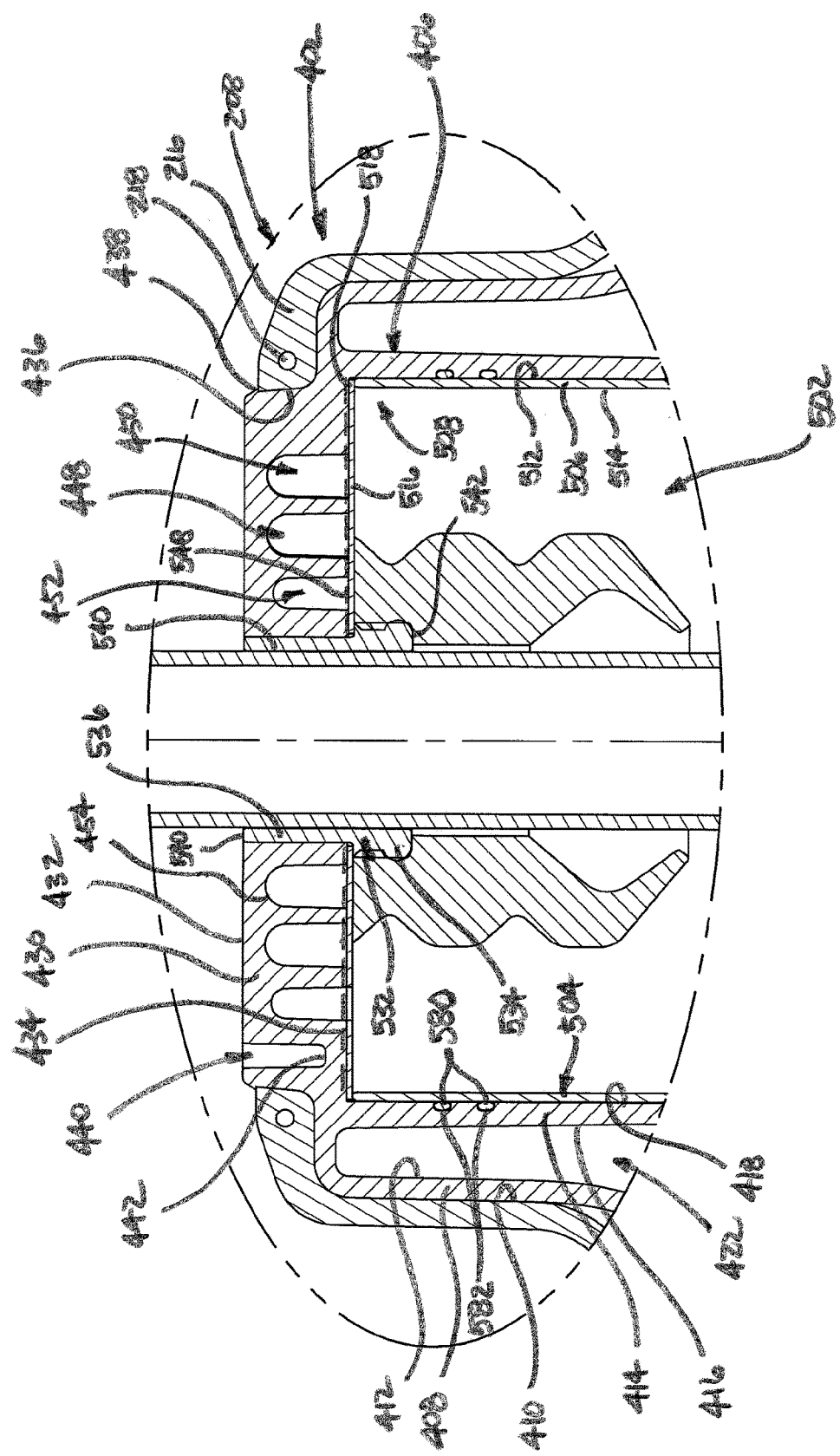
FIG. 8 is a greatly enlarged view of the portion of the exemplary gas spring and damper in FIGS. 2-7 that is identified as Detail 8 in FIG. 7.
Figure 9:
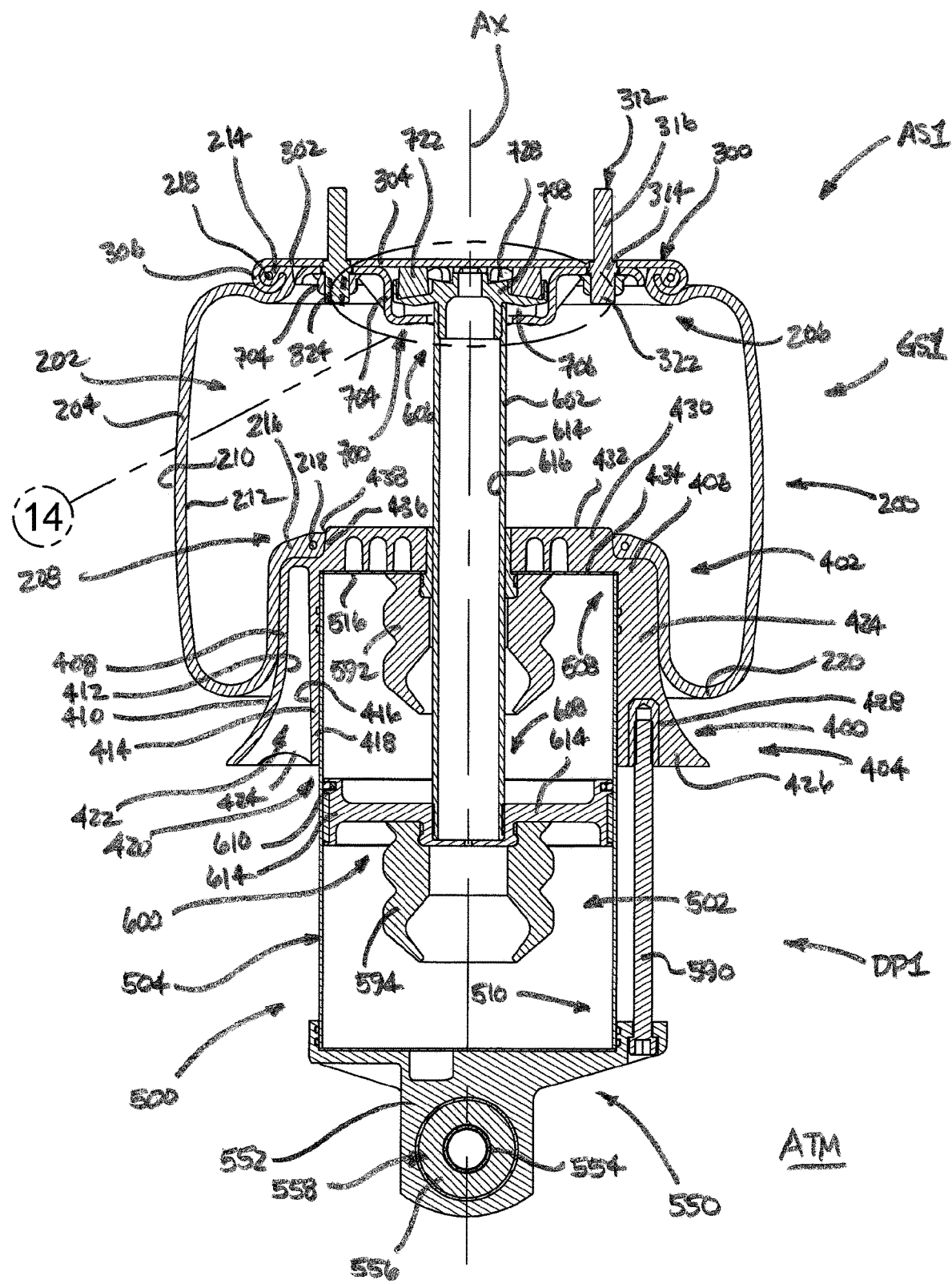
FIG. 9 is a cross-sectional side view of the exemplary gas spring and damper assembly in FIGS. 2-8 taken from along line 9-9 in FIG. 4.
Figure 10:
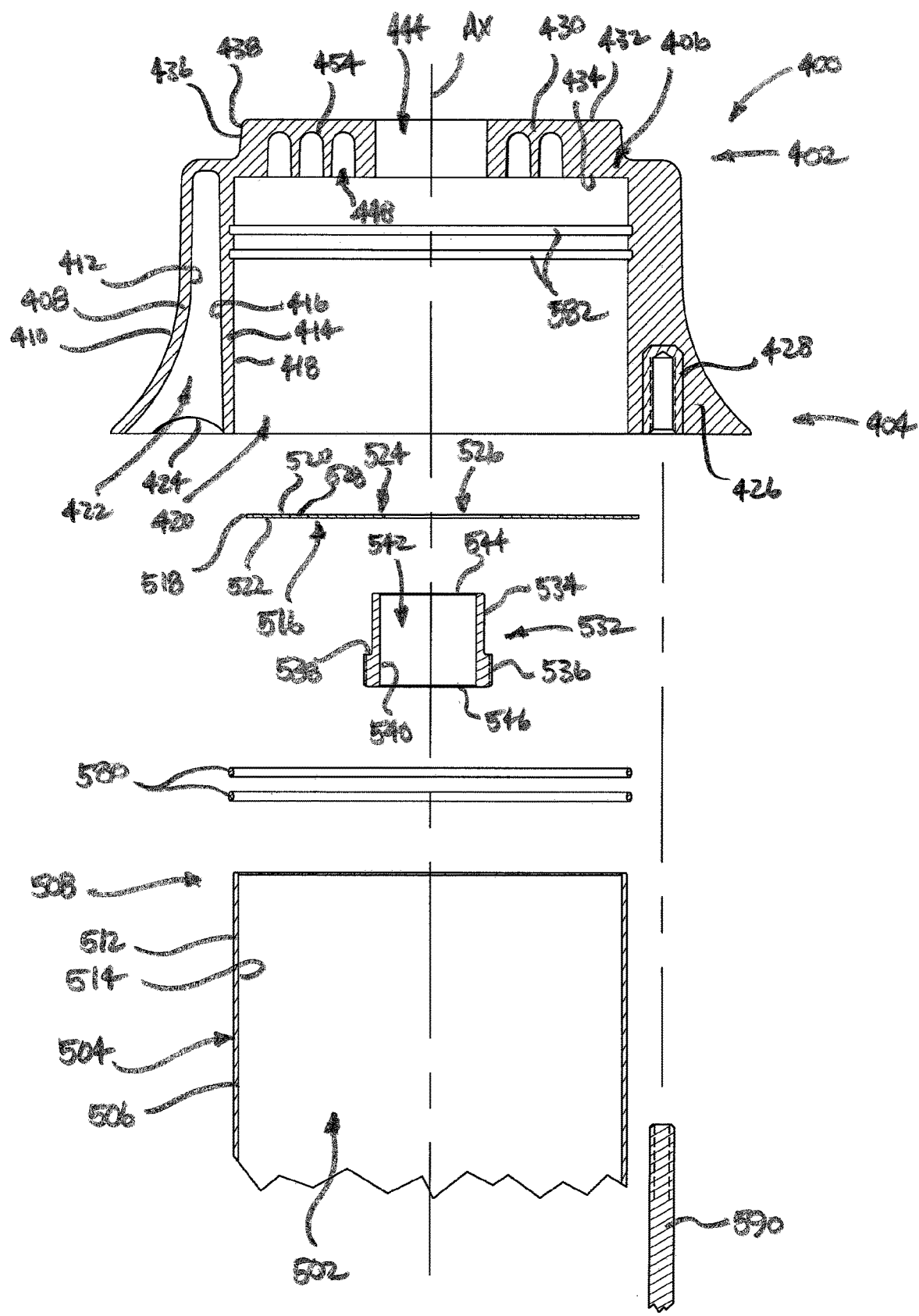
FIG. 10 is an exploded view, in partial cross section, of one portion of the gas spring and damper assembly in FIGS. 2-9.
Figure 11:
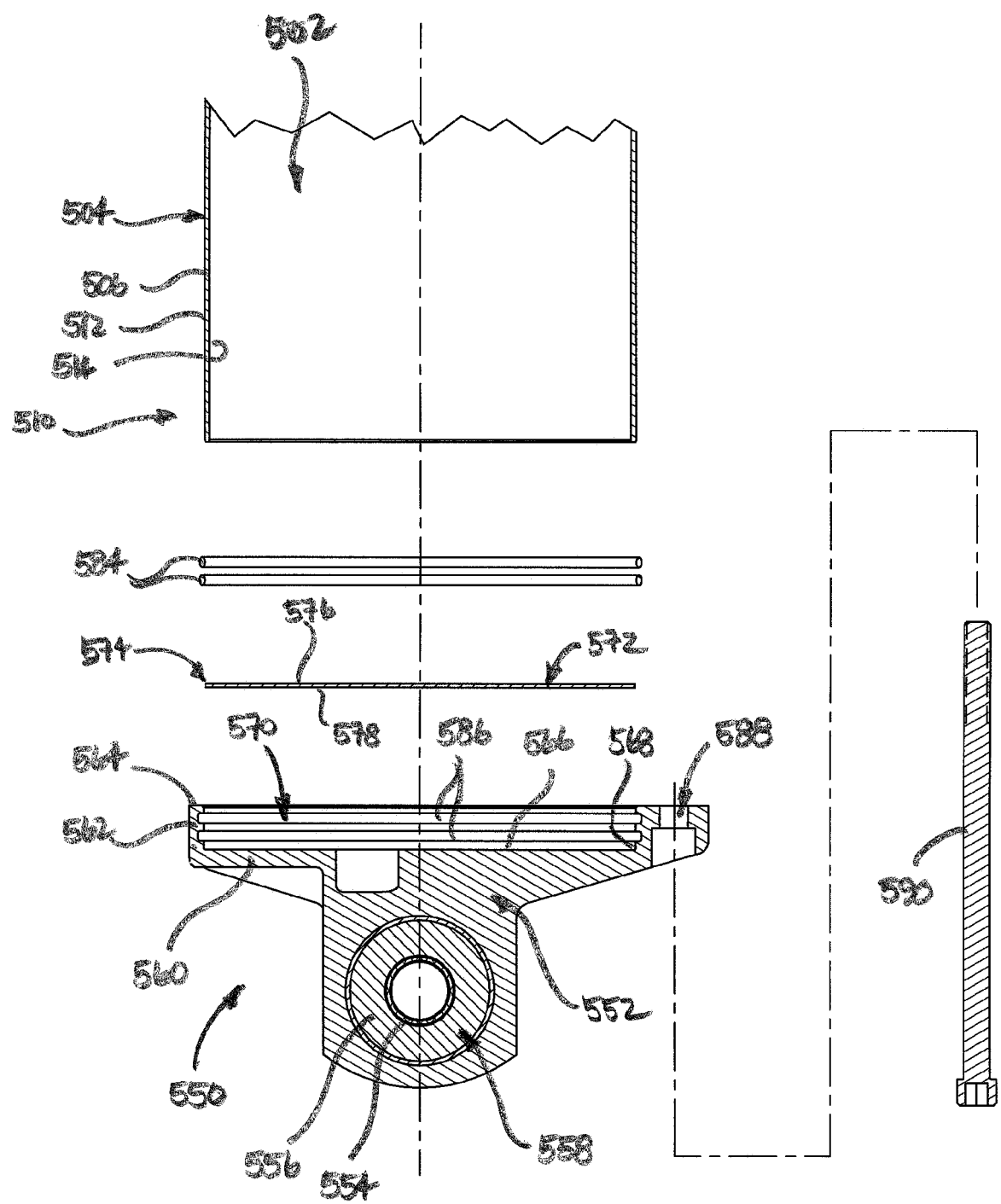
FIG. 11 is an exploded view, in partial cross section, of another portion of the gas spring and damper assembly in FIGS. 2-10.
Figure 12:
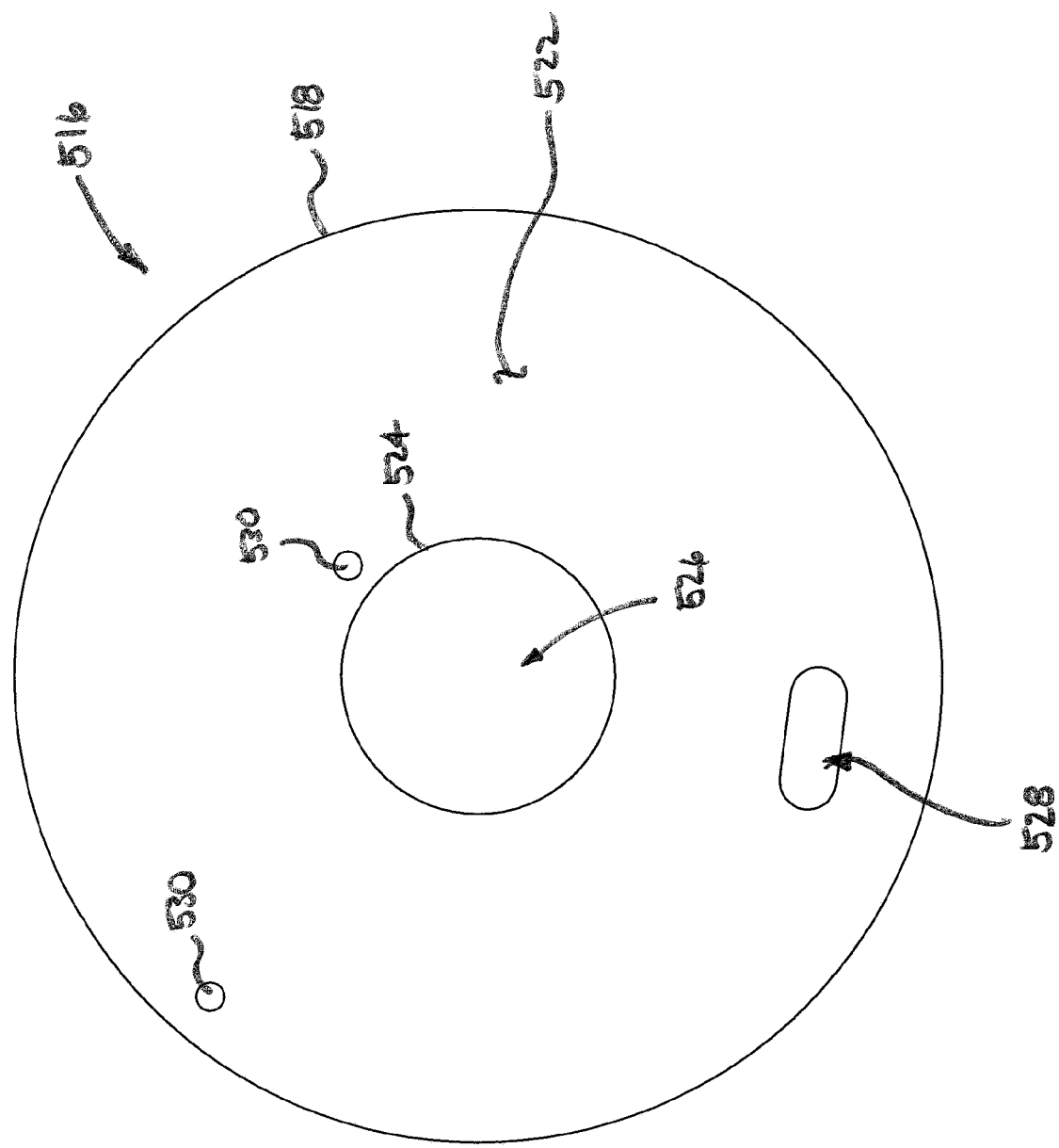
FIG. 12 is a top plan view of one example of an end plate of the gas spring and damper assembly in FIGS. 2-11.

Having described an example of a suspension system (e.g., suspension system 100) that can include gas spring and damper assemblies in accordance with the subject matter of the present disclosure, one example of such a gas spring and damper assembly will now be described in connection with FIGS. 2-11. As shown therein, one example of a gas spring and damper assembly AS1, such as may be suitable for use as one or more of gas spring and damper assemblies 102 in FIG. 1, for example. Gas spring and damper assembly AS1 is shown as including a gas spring (or gas spring assembly) GS1, such as may correspond to one of gas springs 104 in FIG. 1, for example, and a damper (or damper assembly) DP1 such as may correspond to one of dampers 106 in FIG. 1, for example. Gas spring assembly GS1 and damper assembly DP1 can be operatively secured to one another and fluidically coupled with one another in any suitable manner, such as is described hereinafter, for example. A longitudinal axis AX extends lengthwise along assembly AS1, as shown in FIGS. 7 and 9.

Gas spring assembly GS1 can include a flexible spring member 200 that can extend peripherally around axis AX and can be secured between opposing end members (or end member assemblies) 300 and 400 in a substantially fluid-tight manner such that a spring chamber 202 is at least partially defined therebetween. Damper assembly DP1 can include a damper housing 500 that is operatively supported on or along end member 400 and a damper rod assembly 600 that is operatively associated with damper housing 500. An end mount 700 can operatively connect damper rod assembly 600 with end member 300.

It will be appreciated that flexible spring member 200 can be of any suitable size, shape, construction and/or configuration. Additionally, the flexible spring member can be of any type and/or kind, such as a rolling lobe-type or convoluted bellows-type construction, for example. Flexible spring member 200 is shown in FIGS. 2-7 and 9 as including a flexible wall 204 that can be formed in any suitable manner and from any suitable material or combination of materials. For example, the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 204 can extend in a generally longitudinal direction between opposing ends 206 and 208. Additionally, flexible wall 204 can include an outer surface 210 and an inner surface 212. The inner surface can at least partially define spring chamber 202 of gas spring assembly GS1. Flexible wall 204 can include an outer or cover ply (not identified) that at least partially forms outer surface 210. Flexible wall 204 can also include an inner or liner ply (not identified) that at least partially forms inner surface 212. In some cases, flexible wall 204 can further include one or more reinforcing plies (not shown) disposed between outer and inner surfaces 210 and 212. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 200 can include any feature or combination of features suitable for forming a substantially fluid-tight connection with end member 300 and/or end member 400. As one example, flexible spring member 200 can include a mounting bead 214 disposed along end 206 of flexible wall 204 and/or a mounting bead 216 disposed along end 208 of the flexible wall. In some cases, the mounting bead, if provided, can, optionally, include a reinforcing element, such as an endless, annular bead wire 218, for example.

Gas spring and damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 6, for example, end member 300 can be operatively disposed along a first or upper structural component USC, such as associated vehicle body BDY in FIG. 1, for example, and can be secured thereon in any suitable manner. As another example, damper housing 500 can be operatively disposed along a second or lower structural component LSC, such as one of associated axles AXL in FIG. 1, for example, and can be secured thereon in any suitable manner.

Additionally, it will be appreciated that the end members can be of any suitable type, kind, construction and/or configuration, and can be operatively connected or otherwise secured to the flexible spring member in any suitable manner. In the exemplary arrangement shown in FIGS. 2-4, 6, 7 and 9, for example, end member 300 is of a type commonly referred to as a bead plate and includes an end member wall 302 with an inner wall portion 304 and an outer peripheral wall portion 306. End member 300 is disposed along end 206 of flexible wall 204 with outer peripheral wall portion 306 crimped or otherwise deformed around at least a portion of mounting bead 214 such that a substantially fluid-tight seal can be formed between flexible spring member 200 and end member 300. Inner wall portion 304 can have an approximately planar outer surface 308 dimensioned to abuttingly engage an associated structural component (e.g., upper structural component USC). Inner wall portion 304 can also have an approximately planar inner surface 310 disposed in facing relation to spring chamber 202.

As indicated above, end member 300 can be disposed in operative engagement on or along first or upper structural component USC (FIG. 6), such as associated vehicle body BDY in FIG. 1, for example, and can be secured thereon in any suitable manner. For example, one or more securement devices, such as mounting studs 312, for example, can be included along end member 300. In some cases, mounting studs 312 can include a section 314 dimensioned for attachment to end member wall 302 in a suitable manner, such as, for example, by way of a flowed-material joint (not shown) or a press-fit connection (not identified).

Additionally, mounting studs 312 can include a section 316 that extends axially from along section 314 and can include one or more helical threads 318. Section 316 can be dimensioned to extend through corresponding mounting holes HLS (FIG. 6) in upper structural component USC (FIG. 6) and can receive one or more securement devices (e.g., threaded nuts) 320. Mounting studs 312 can also include a section 322 that extends axially from along section 314 in a direction opposite section 316. As such, section 322 can extend into spring chamber 202 and can include one or more helical threads 324 dimensioned to receive one or more threaded nuts or other securement devices, such as, for example, may be used to secure one or more devices and/or components of end mount 700 on or along inside surface 310 of end member 300, for example.

Figure 2:
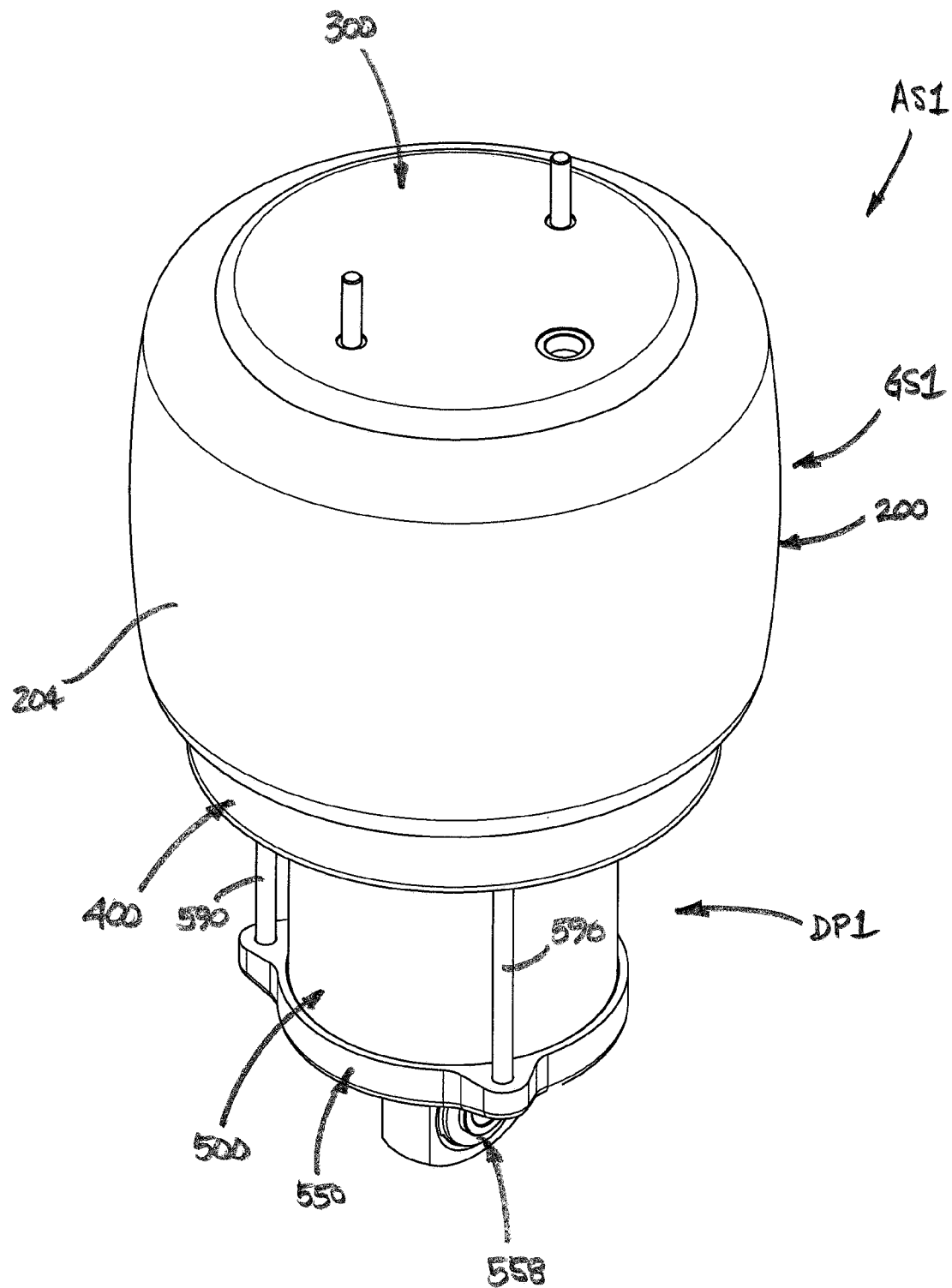
FIG. 2 is a top perspective view of one example of a gas spring and damper assembly in accordance with the subject matter of the present disclosure.
Figure 3:
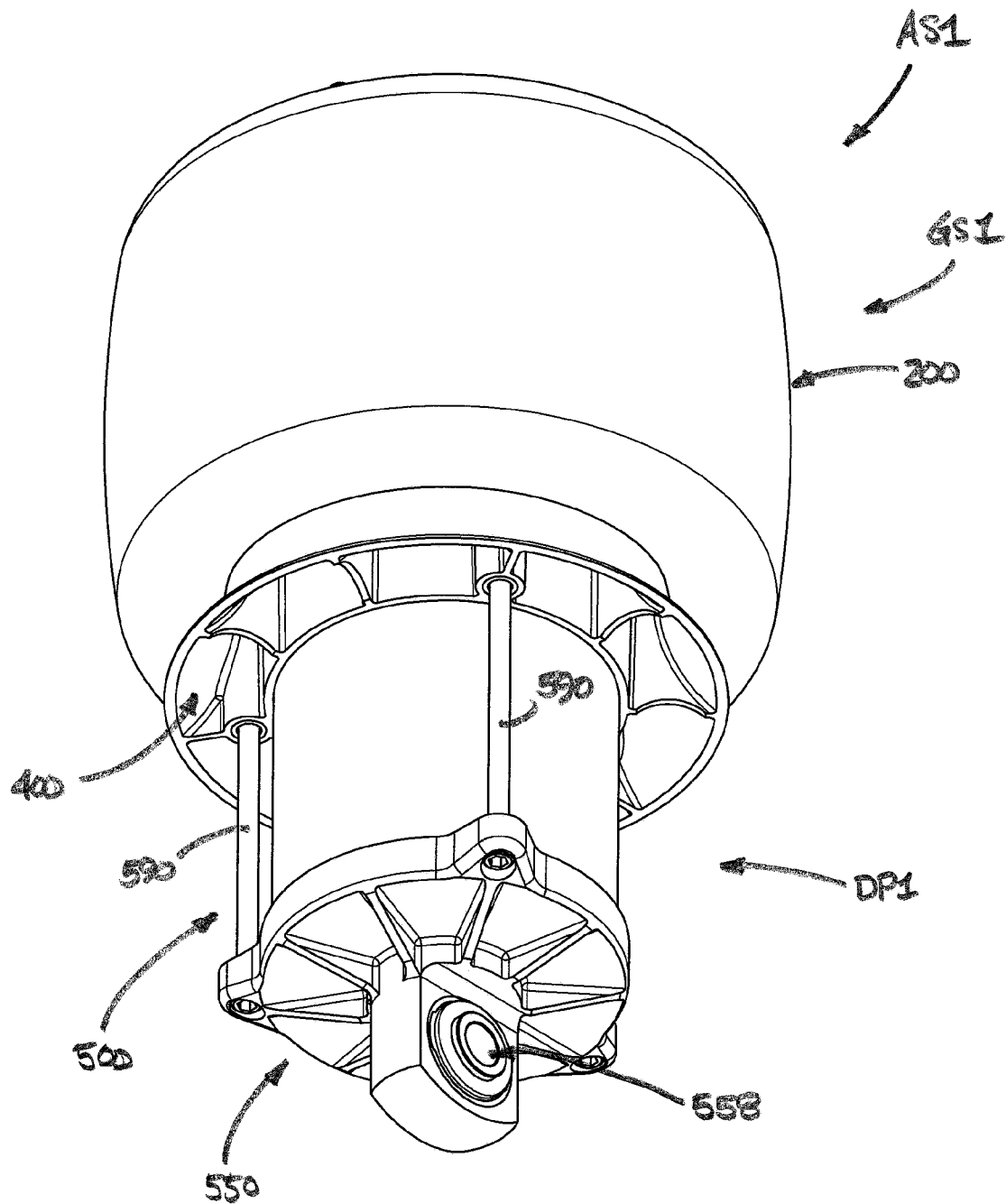
FIG. 3 is a bottom perspective view of the exemplary gas spring and damper assembly in FIG. 2.
Figure 4:
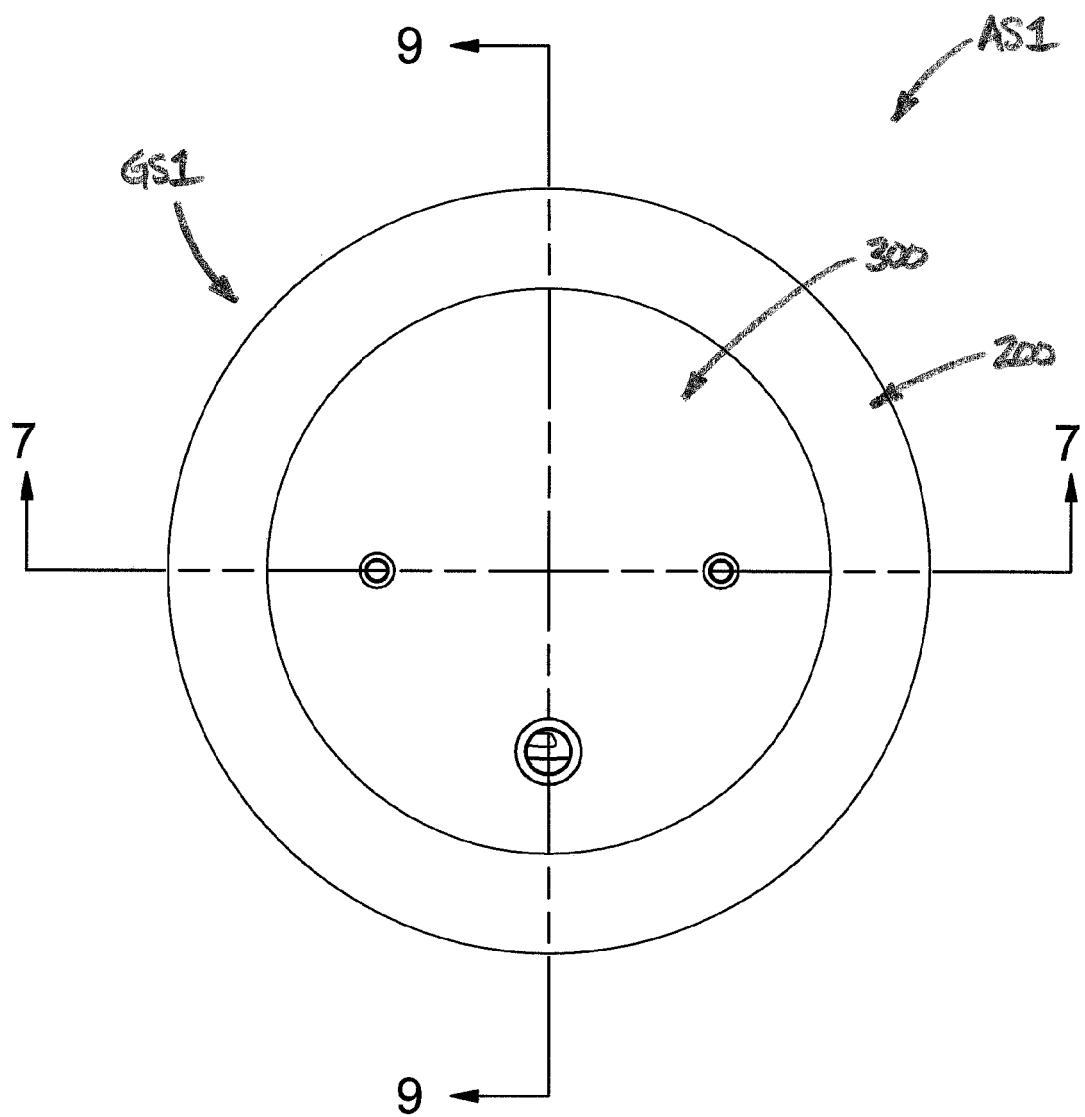
FIG. 4 is a top plan view of the exemplary gas spring and damper assembly in FIGS. 2 and 3.
Figure 5:
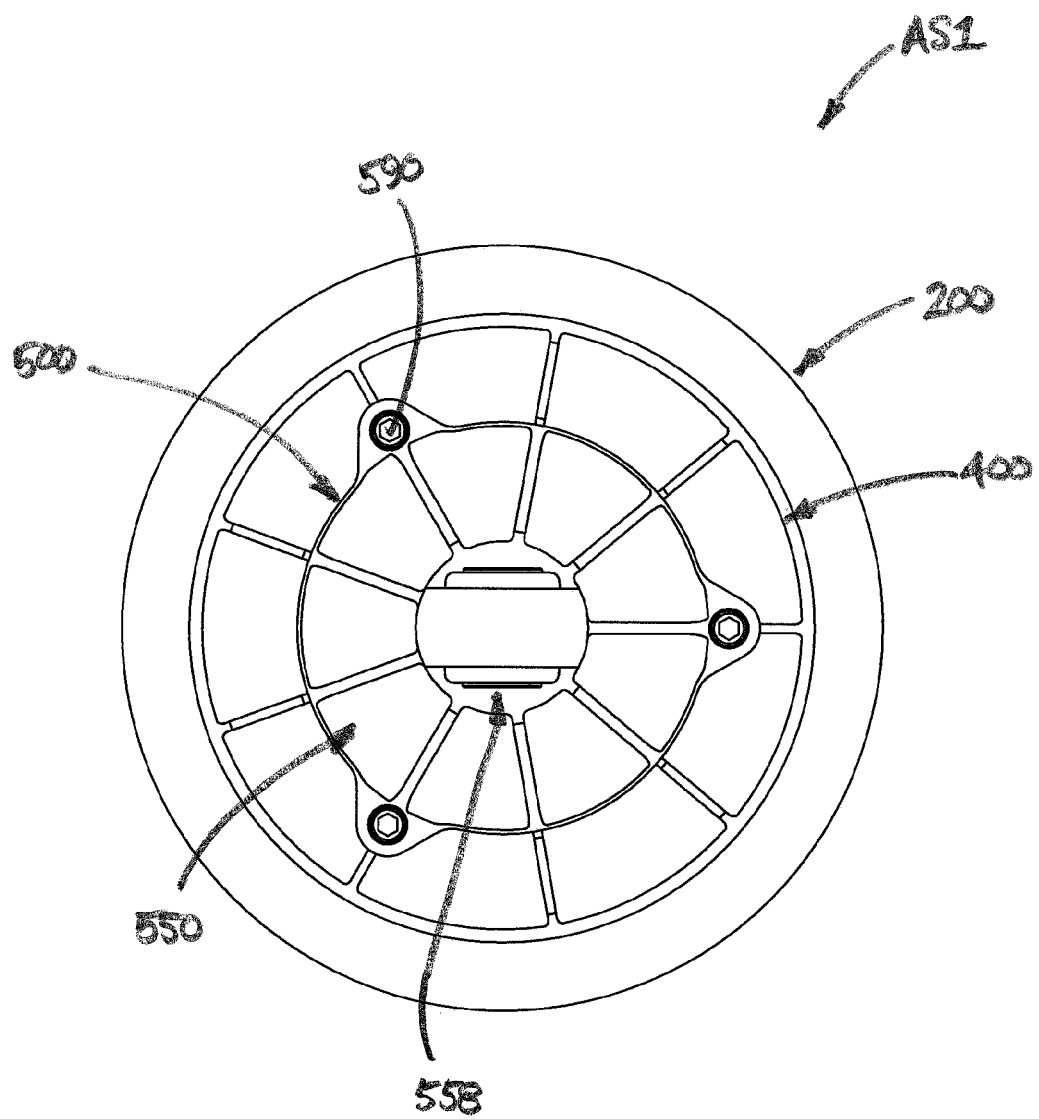
FIG. 5 is a bottom plan view of the exemplary gas spring and damper assembly in FIGS. 2-4.

Furthermore, one or more fluid communication ports or transfer passages can optionally be provided to permit fluid communication with the spring chamber, such as may be used for transferring pressurized gas into and/or out of the spring chamber, for example. In some cases, a transfer passage (not shown) can extend through one or more of the mounting studs. In other cases, such as is shown in FIGS. 2, 4 and 7, for example, end member 300 can include a passage fitting 326 that can be secured on or along end member wall 302 in a substantially fluid-tight manner, such as by way of a flowed-material joint 328, for example. A transfer passage 330 can extend through end member wall 302 and passage fitting 326 that is in fluid communication with spring chamber 212. It will be appreciated, however, that any other suitable fluid communication arrangement could alternately be used.

End member 400 is shown as being disposed in axially-spaced relation to end member 300, and as including features associated with a type of end member commonly referred to as a piston (or a roll-off piston). It will be recognized that a wide variety of sizes, shapes, profiles and/or configurations can and have been used in forming end members of the type and kind referred to as pistons or roll-off pistons, such as end member 400, for example. As such, it will be appreciated that the walls and/or wall portions of the end member can be of any suitable shape, profile and/or configuration, such as may be useful to provide one or more desired performance characteristics, for example, and that the profile shown in FIGS. 2-11 and 13-18 is merely exemplary.

End member 400 can extend lengthwise between opposing ends 402 and 404 that are axially spaced from one another. End member 400 can include an end member wall 406 that can have a first or outer side wall portion 408 that extends in a generally axial direction and includes an outside surface 410 and an inside surface 412. End member 400 can also include a second or inner side wall portion 414 that also extends in a generally axial direction. Inner side wall portion 414 is spaced radially inward from outer side wall portion 408 and includes an outside surface 416 and an inside surface 418. In a preferred arrangement, inside surface 418 of inner side wall portion 414 can at least partially define an inner cavity 420 within end member 400.

In the arrangement shown in FIGS. 2-11 and 13-18, end member 400 includes an outer cavity 422 extending into the end member between inside surface 412 of outer side wall portion 408 and outside surface 416 of inner side wall portion 414. In some cases, one or more support wall portions 424 can extend between and operatively interconnect the outer and inner side wall portions. Additionally, in some cases, one or more bosses or projections can be provided on or along the end member wall, such as may be suitable for including one or more securement devices and/or securement features. In the exemplary arrangement shown in FIGS. 2-11 and 13-18, for example, end member wall 406 can include boss wall portions 426 that can be formed or otherwise disposed along one or more of outer side wall portion 408, inner side wall portion 414 and/or support wall portions 424, for example. In some cases, one or more securement features (e.g., threaded passages) can extend into or be otherwise formed on or along the boss wall portions. In other cases, one or more securement devices 428, such as threaded metal inserts, for example, can be at least partially embedded within one of more of boss wall portions 426. It will be appreciated, however, that other configurations and/or arrangements could alternately be used.

End member wall 406 can also include an end wall portion 430 that can extend across and/or between any combination of one or more of outer side wall portion 408, inner side wall portion 414 and/or support wall portions 424. End wall portion 430 can be oriented transverse to axis AX and can at least partially form a closed end of inner cavity 420 of the end member. Additionally, end wall portion 430 can include opposing surfaces 432 and 434. As indicated above, it will be appreciated that the one or more end members of the gas spring and damper assembly can be operatively connected or otherwise secured to the flexible spring member in any suitable manner. In the case of end member 400, end member wall 406 can, for example, include an outer surface 436 that extends peripherally about axis AX and is dimensioned to receive mounting bead 216 disposed along end 208 of the flexible wall 204 such that a substantially fluid-tight seal can be formed therebetween. In some cases, a retaining ridge 438 can project radially outward beyond outer surface 436 and can extend peripherally along at least a portion thereof, such as may assist in retaining end 208 of flexible wall 204 in abutting engagement on or along the end member.

In an assembled condition, outer surface 210 of flexible wall 204 can be disposed in abutting engagement with outside surface 410 of outer side wall portion 408. In such an arrangement, flexible wall 204 of flexible spring member 200 can form a rolling lobe 220 along outside surface 410 of outer side wall portion 408. As gas spring and damper assembly AS1 is displaced between compressed and extended conditions, rolling lobe 220 can be displaced along outer surface 410 in a generally conventional manner.

As mentioned above, a gas spring and damper assembly in accordance with the subject matter of the present disclosure can, in some cases, include a damper of an otherwise conventional construction that utilizes hydraulic oil or other liquid as a working medium of the damper. In other cases, the damper can be of a type and kind that utilizes pressurized gas as a working medium. In such cases, such a gas damper can include one or more elongated gas damping passages through which pressurized gas can flow to generate pressurized gas damping to dissipate kinetic energy acting on the gas spring and damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

A gas spring and damper assembly in accordance with the subject matter of the present disclosure can include one or more elongated gas damping passages fluidically connected between the spring chamber and one or more damping chambers or damping chamber portions. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

A gas spring and damper assembly in accordance with the subject matter of the present disclosure can include one or more elongated gas damping passages in fluid communication between the spring chamber and one or more damping chambers or damping chamber portions. Differential pressure between the volumes can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

In the exemplary construction shown in FIGS. 7-10 and 13-18, end member wall 406 of end member 400 can include a plurality of recesses 440 that can extend into end member wall 406 from along surface 432. Recesses 440 are shown as being disposed in peripherally spaced relation to one another about axis AX. The recesses are also shown as being spaced radially outward from the axis toward outer surface 436 and varying in size and shape relative to one another. In a preferred arrangement, recesses 440 are blind recesses and include a bottom surface 442 (FIG. 18) such that the recesses do not extend or otherwise form a passage through end member wall 406.

End member wall 406 of end member 400 can include an opening or passage 444 extending through end wall portion 430 between surfaces 432 and 434. In a preferred arrangement, passage 444 can be oriented in approximately co-axial alignment with axis AX. Also, in a preferred arrangement, passage 444 can be dimensioned to receive and permit one or more components of damper assembly DP1 to extend through end wall portion 430, as discussed in greater detail below.

End member 400 can also include a passage or port 446 extending into and at least partially through end wall portion 430 of end member wall 406 from along surface 432. In a preferred arrangement, passage 446 is disposed radially outward of passage 444 and adjacent or otherwise toward outer surface 436 of end wall portion 430. End member 400 can further include an elongated damping passage 448 extending into, through or otherwise along at least a portion of end wall portion 430 of end member wall 406. In a preferred arrangement, elongated damping passage 448 has a first end 450 disposed in fluid communication with port 446 and a second end 452 disposed radially inward of port 446. In other cases, the passage or port could be disposed radially inward adjacent or otherwise toward passage 444 with the second end of the elongated damping passage disposed radially outward of the first end.

In either case, it will be appreciated that elongated damping passage 448 can be of any suitable shape, form, configuration and/or arrangement. In a preferred arrangement, elongated damping passage 448 can have a spiral-like or similar configuration. In such case, the elongated damping passage can be at least partially formed by a passage surface 454 that has a cross-sectional profile. In some cases, the cross-sectional profile can vary along the length of the elongated damping passage. In a preferred arrangement, however, the cross-sectional profile can be of an approximately uniform size, shape and configuration along the length of the elongated damping passage, such as is shown in FIGS. 7-10 and 16-18, for example. The cross-sectional profile is taken from an orientation that is normal, perpendicular or at least transverse to the spiral-like path of the elongated damping passage. That is, the cross-sectional profile is oriented transverse to axis AX and is substantially-continuously rotated about the axis with the cross-sectional profile substantially-continuously displaced radially outward from adjacent axis AX to form the spiral-like configuration. In a preferred arrangement, such rotation of the cross-sectional profile of passage surface 454 can occur in an approximately single plane such that the spiral-like configuration of elongated damping passage 448 is disposed in a common plane that is oriented transverse to longitudinal axis AX.

In some cases, the cross-sectional profile of passage surface 454 can be endless or otherwise fully enclosed. In such cases, the corresponding elongated damping passage can be substantially-entirely embedded within the end wall portion of the end member wall. In other cases, the cross-sectional profile of passage surface 454 can be open (i.e., not fully enclosed). In such cases, the corresponding elongated damping passage can be open along one or more surfaces of end wall portion 430 of end member wall 406. For example, the cross-sectional profile of passage surface 454 is shown as having an approximately U-shaped cross-sectional configuration. As such, elongated damping passage 448 is formed within end wall portion 430 of end member wall 406 as an open channel that is accessible from along surface 434 of the end wall portion. It will be appreciated, however, that other configurations and/or arrangements could alternately be used. For example, a cross-sectional profile in a C-shaped configuration could be used.

With reference, now, to damper assembly DP1, damper housing 500 is operatively engaged with end member 400 and at least partially defines a damping chamber 502 on, along and/or within at least a portion of end member 400. Additionally, damper housing 500 secured on or along end member 400 such that forces and loads acting on one of upper and lower structural components USC and LSC can be transmitted or otherwise communicated to the other of upper and lower structural components USC and LSC at least partially through gas spring and damper assembly AS1.

Damper housing 500 can include or be otherwise formed from any combination of one or more components and/or devices. For example, damper housing 500 can include a housing sleeve 504 that can be at least partially formed from a sleeve wall 506 that extends axially between opposing ends 508 and 510. Sleeve wall 506 can extend peripherally about axis AX and can, in some case, have an approximately uniform wall thickness. Additionally, in some cases, sleeve wall 506 can have an approximately circular cross-sectional profile such that the inner sleeve is approximately cylindrical in overall shape. It will be appreciated, however, that other configurations and/or arrangements could alternately be used. Additionally, sleeve wall 506 includes an outer surface 512 that extends substantially-continuously around and along housing sleeve 504. In a preferred arrangement, sleeve wall 506 is dimensioned to be received within inner cavity 420 of end member 400 with outer surface 512 disposed in facing relation to inside surface 418 of inner side wall portion 414. Sleeve wall 506 can also include an inner surface 514 that extends substantially-continuously around and along housing sleeve 504 and can at least partially define damping chamber 502.

As discussed above, gas spring and damper assembly AS1 is displaceable, during use in normal operation, between extended and compressed conditions. During such displacement pressurized gas flow between spring chamber 202 and damping chamber 502 through elongated damping passage 448 generates pressurized gas damping. In some cases, the cross-sectional profile of the elongated damping passage can be endless or otherwise fully enclosed such that the corresponding elongated damping passage is substantially-entirely embedded within the end wall portion of the end member wall. In other cases, the cross-sectional profile of elongated damping passage 448 can be open or otherwise not fully enclosed. In such cases, damper housing 500 can include an end plate 516 that can extend across and at least partially enclose elongated damping passage 448.

As shown in FIGS. 7-10 and 12, for example, end plate 516 can take the form of a substantially planar wall having an outer peripheral edge 518 and opposing side surfaces 520 and 522. End plate 516 can also include an inner peripheral edge 524 that at least partially defines a hole or opening 526 extending therethrough. In a preferred arrangement, hole 526 can be positioned approximately centrally on end plate 516 and can be dimensioned to receive and permit one or more components of damper assembly DP1 to extend through end wall portion 430, as discussed in greater detail below. End plate 516 can also include a passage or port 528 extending therethrough that is dimensioned for fluid communication with second end 452 of elongated damping passage 448. To aid in aligning port 528 with second end 452 of the elongated damping passage during assembly and maintaining such an alignment during use, end plate 516 can include one or more indexing or alignment features that operatively engage one or more other features and/or components of end member 400 and/or damper housing 500. For example, end member 400 could include one or more projections 456 or other indexing features that extend axially outwardly from along surface 434 of end wall portion 430. End plate 516 can include one or more indexing holes 530 that extend through the end plate and are cooperative with projections 456 to orient and align end plate 516 relative to end wall portion 430 of end member wall 406. Additionally, or as an alternative, one or more holes or openings could be included on or along the end wall portion of the end member wall, and one or more projections could be included on or along the end plate. In any case, cooperative engagement of alignment or indexing features (e.g., projections 456) of end member 400 with alignment or indexing features (e.g., indexing holes 530) of end plate 516 can aid in assembly and assist in ensuring that port 528 and second end 452 of elongated damping passage 448 are at least approximately aligned and in fluid communication with one another.

It will be appreciated that end plate 516 can be secured on or along surface 434 of end wall portion 430 of end member wall 406 in any suitable manner and/or through the use of any combination of one or more features and/or components. For example, end plate 516 can be disposed between end member 400 and housing sleeve 504 such that surface 520 is disposed in facing relation with surface 434 of end wall portion 430. In such case, end 508 of housing sleeve 504 can abuttingly engage the end plate along outer peripheral edge 518 to retain the end plate in position relative to the end wall portion of the end member wall.

Additionally, or in the alternative, damper housing 500 can include a support ring 532 that can be secured on or along end wall portion 430 of end member wall 406 in operative engagement with end plate 516 to at least partially retain the end plate on or along surface 434 of the end wall portion. Support ring 532 can include an annular wall with a first outer surface portion 534 having a first cross-sectional size or dimension that is cooperative with passage 444 in end wall portion 430 of end member wall 406. Support ring 532 can also include a second outer surface portion 536 that is spaced axially from the first outer surface portion and has a second cross-sectional size or dimension that is greater than the first cross-sectional size or dimension of first outer surface portion 534 such that a shoulder surface portion 538 extends radially therebetween.

Support ring 532 can be installed on end wall portion 430 of end member wall 406 with first outer surface portion 534 at least partially disposed within passage 444 and can be secured on the end wall portion in any suitable manner, such as by way of a threaded connection, a press-fit connection and/or a flowed-material joint, for example. In such case, support ring 532 can at least partially secure end plate 516 on or along end wall portion 430. For example, first outer surface portion 534 can extend through opening 526 in end plate 516 such that shoulder surface portion 538 can abuttingly engage the end plate along inner peripheral edge 524. Support ring 532 can also include an inner surface 540 that at least partially defines a passage or opening 542 extending through support ring 532 between opposing end surfaces 544 and 546. In an installed condition, passage 542 dimensioned to receive and permit one or more components of damper assembly DP1 to extend through end wall portion 430, as discussed in greater detail below.

In cases in which the cross-sectional profile of passage surface 454 is open or otherwise not fully enclosed, it may be desirable to substantially inhibit or at least reduce pressurized gas transfer between adjacent rings or other sections of elongated damping passage 448 along surface 434. It will be appreciated that inhibiting or at least reducing such undesirable pressurized gas transfer may promote pressurized gas flow along elongated damping passage 448 and, thus, provide improved gas damping performance. It will be appreciated that such undesirable pressurized gas transfer can be inhibited or otherwise reduced in any suitable manner and through the use of any suitable components, features and/or elements. As one example, one or more sealing elements could be disposed between surface 434 of end wall portion 430 and surface 520 of end plate 516 to at least partially form a substantially fluid-tight seal therebetween. As another example, a flowed material joint could be formed between the surface of the end wall portion and the surface of the end plate. Such sealing arrangements are collectively schematically represented in FIG. 8 by dashed lines 548.

With reference, now, to FIGS. 2-7, 9, 11 and 19-22, damper housing 500 can also include an end cap 550 operatively disposed along end 510 of housing sleeve 504 and secured thereto such that gas spring and damper assembly AS1 can function to transfer forces and loads between upper and lower structural components USC and LSC, as discussed above. End cap 550 can be configured to secure gas spring and damper assembly AS1 on or along an associated structural component, such as lower structural component LSC, for example. It will be appreciated any suitable combination of features, elements and/or components can be used to form such a connection. As one example, the end cap can include a spherical bearing or other similar component operatively connected between the end cap mount and the associated structural component (e.g., lower structural component LSC). As another example, end cap 550 can include an end cap wall 552 that includes a passage (not numbered) formed therethrough generally transverse to axis AX. End cap wall 552 can function as an outer support element and an inner support element 554 can be disposed within the passage. An elastomeric connector element 556 can be permanently attached (i.e., inseparable without damage, destruction or material alteration of at least one of the component parts) between end cap wall 552 and inner support element 554 to form an elastomeric bushing 558 suitable for pivotally mounting assembly AS1 on or along the associated structural component.

End cap wall 552 can include a base wall portion 560 oriented approximately transverse to axis AX and a side wall portion 562 that extends axially from along base wall portion 560 toward a distal edge 564. Base wall portion 560 can have a base surface 566 and side wall portion 562 can have an inner side surface 568. Base wall portion 560 and side wall portion 562 can at least partially define an end cap cavity 570 that is dimensioned to receive end 510 of housing sleeve 504 with outer surface 512 disposed in facing relation to inner side surface 568 of side wall portion 562. In some cases, damper housing 500 can also include an end plate 572 in the form of a substantially planar wall having an outer peripheral edge 574 and opposing side surfaces 576 and 578. It will be appreciated that end plate 572 can be secured on or along end cap 550 in any suitable manner and/or through the use of any combination of one or more features and/or components. For example, end plate 572 can be disposed between end cap 550 and housing sleeve 504 such that side surface 578 is disposed in facing relation with base surface 566 of end cap wall 552. In such case, end 510 of housing sleeve 504 can abuttingly engage end plate 572 along outer peripheral edge 574 to retain the end plate in position relative to end cap wall 552 of the end cap.

In a preferred arrangement, spring chamber 202 and damping chamber 502 are in fluid communication with one another through elongated damping passage 448 and any associated ports or passages. As such, it may be desirable to maintain spring chamber 202 and damping chamber 502 in fluidic isolation with respect to an external atmosphere ATM. In such cases, damper assembly DP1 can include one or more substantially fluid-tight seals that can be formed in any suitable manner between end member 400 and components of the damper assembly and/or between two or more components of damper assembly DP1. For example, one or more sealing elements 580 can be fluidically disposed between inner side wall portion 414 of end member wall 406 and housing sleeve 504 such that a substantially fluid-tight seal is formed therebetween. It will be appreciated that sealing elements 580 can be secured on, along or otherwise between such components in any suitable manner. For example, one or more annular grooves 582 can extend into inner side wall portion 414 from along inside surface 418 thereof that are dimensioned to receive and retain the sealing elements. As another example, one or more sealing elements 584 can be fluidically disposed between side wall portion 562 of end cap wall 552 and housing sleeve 504 such that a substantially fluid-tight seal is formed therebetween. It will be appreciated that sealing elements 584 can be secured on, along or otherwise between such components in any suitable manner. For example, one or more annular grooves 586 can extend into side wall portion 562 from along inner side surface 568 thereof that are dimensioned to receive and retain the sealing elements.

Additionally, end cap wall 552 can include one or more passages 588 formed therethrough. Passages 588 can be oriented in approximate alignment with axis AX. Additionally, in a preferred arrangement, passages 588 can be disposed in approximate alignment with securement devices 428 of boss wall portions 426 on end member 400. In such case, securement devices 590 (e.g., threaded fasteners) can extend through passages 588 and into engagement with securement devices 428 to attach and secure end cap 550 on or along at least one of end member 400 and housing sleeve 504.

In some cases, one or more jounce bumpers can be included to inhibit contact between one or more features and/or components of assembly AS1. For example, a jounce bumper 592 can be disposed within a portion of damping chamber 502, such as by securement on or along second outer surface portion 536 of support ring 532, for example, to substantially inhibit contact between a component of damper rod assembly 600 and one or more of end member 400, end plate 516 and support ring 532 during a full rebound condition of assembly AS1. Additionally, or in the alternative, a jounce bumper 594 can be disposed within a portion of damping chamber 502, such as by securement on or along a component of damper rod assembly 600, for example, to substantially inhibit contact between components of the damper rod assembly and end cap 550 and/or end plate 572 during a full jounce condition of assembly AS1.

Damper rod assembly 600 includes an elongated damper rod 602 and a damper piston 604. Damper rod 602 extends longitudinally from an end 606 to an end 608. End 606 of damper rod 602 can include a securement feature dimensioned for operatively connecting the damper rod on or along end member 300. As one example, damper rod 602 can include one or more helical threads disposed along end 606. Damper piston 604 can be disposed along end 608 of damper rod 602 and can be attached or otherwise connected thereto in any suitable manner. For example, the damper piston could be integrally formed with the damper rod. As another example, end 608 of damper rod 602 could include a securement feature, such as one or more helical threads, for example. In such case, damper piston 604 could be provided separately and could include a passage or hole (not numbered) into which end 608 of damper rod 602 can be secured. In a preferred arrangement, a blind passage or hole can be used to assist in maintaining fluidic isolation across damper piston 604.

In an assembled condition, damper rod assembly 600 is disposed along gas spring assembly GS1 such that damper piston 604 is received within damping chamber 502 of damper housing 500. In such case, damper rod 602 can extend through the passage 542 formed by support ring 532 and such that end 606 of damper rod 602 is disposed out of damping chamber 502. In such cases, support ring 532 can function as a bearing or bushing element operative to reduce frictional engagement on or along damper rod 602. In some cases, a sealing element and/or a wear bushing can optionally be included on or along the support ring.

Additionally, it will be appreciated that damper piston 604 separates damping chamber 502 into damping chamber portions 502A and 502B disposed along opposing sides of the damper piston. In some cases, a sealing element 610 can be disposed between an outer peripheral wall 612 of damper piston 604 and inner surface 514 of housing sleeve 504. It will be recognized, however, that in some cases significant frictional forces may be generated by the sealing arrangements described above in connection with the interface between damper piston 604 and inner surface 514 as well as in connection with the interface between an outer surface 614 of damper rod 602 and support ring 532. In some cases, it may be desirable to avoid or at least reduce such frictional forces (or for other reasons) by forgoing the use of sealing elements along either or both interfaces. In such cases, one or more friction reducing bushings or wear bands can, optionally, be disposed therebetween. Furthermore, in some cases, damper rod 602 can take the form of a hollow rod that includes an inner surface 616.

It will be appreciated, that the movement of associated structural components relative to one another, as described above, can be due to variations in load conditions and/or result from road inputs and/or other impact conditions (e.g., jounce conditions), as is well understood by those of skill in the art. Additionally, it will be recognized and appreciated that gas spring and damper assemblies, such as assembly AS1, for example, and/or components thereof will typically move relative to one another in a curvilinear, rotational, arcuate, angular or other non-linear manner. As such, a pivotal mount, such as elastomeric bushing 558, for example, can be used to permit some movement of gas spring and damper assembly AS1 relative to lower structural component LSC. In many cases, a gas spring is also capable of accommodating non-linear movement of the upper and lower structural components relative to one another. However, in constructions in which an elongated damping rod or other similar component extends through the spring chamber and operatively connects the end members of the gas spring, a mounting assembly can be included that permits pivotal motion between at least one of the end members and the elongated damping rod to accommodate the non-linear movement of the associated structural components relative to one another.

One example of an end mount assembly 700 is shown in FIGS. 7 and 9 as being secured along end member 300 and operatively connected to end 606 of elongated damper rod 602. End mount assembly 700 can, in some cases, optionally include a mounting bracket 702 that can be secured on or along end member 300 in a suitable manner. For example, mounting bracket 702 can operatively engage section 322 of mounting studs 312 and can be secured thereon by suitable securement devices, such as threaded fasteners 704 operatively engaging helical threads 324, for example. Mounting bracket 702 can at least partially define a mounting cavity 706 with end member 300. In a preferred arrangement, mounting cavity 706 can have a cross-sectional dimension (e.g., diameter) to height ratio within a range of from approximately three (3) to approximately six (6). End mount assembly 700 can also include an inner mounting element 708 dimensioned for securement on or along end 606 of damper rod 602. It will be appreciated that inner mounting element 708 can be of any suitable size, shape and/or configuration. As one example, inner mounting element 708 can include an element wall 710 with a connector portion 712 dimensioned for securement to the damper rod and a flange portion 714 projecting radially outward from connector portion 712. Flange portion 714 can have a first side 716 facing toward connection portion 712 and a second side 718 facing away from the connector portion and toward end member 300.

End mount assembly 700 can include a first plurality of bushing elements 720 disposed along first side 716 of flange portion 714 of the inner mounting element. In a preferred arrangement, bushing elements 720 are disposed in peripherally-spaced relation to one another about axis AX and/or about first side 716 of flange portion 714. End mount assembly 700 can also include a second plurality of bushing elements 722 disposed along second side 718 of flange portion 714 of the inner mounting element. Again, in a preferred arrangement, bushing elements 722 are disposed in peripherally-spaced relation to one another about axis AX and/or about second side 718 of the flange portion of the inner mounting element. In a preferred arrangement, a common quantity of bushing elements 720 and 722 can be used with the bushing elements disposed in an approximately uniform spacing or pattern about axis AX and/or along the respective side of the flange portion of inner mounting element 708. Additionally, in a preferred arrangement, bushing elements 720 and 722 can be arranged on opposing sides of flange portion 714 in an interleaved or otherwise alternating pattern or configuration with respect to one another. It will be appreciated, however, that other configurations and/or arrangements could alternately be used.

In some cases, end mount assembly 700 can, optionally, include a third plurality of bushing elements 724 disposed along one side of the flange portion of the inner mounting element. In the arrangement shown in FIGS. 7 and 9, for example, bushing elements 724 are disposed along second side 718 of flange portion 714. Bushing elements 724 are shown as being disposed in peripherally-spaced relation with one another about axis AX and/or along the second side of the flange portion. Additionally, bushing elements 724 are shown as being positioned radially inward relative to bushing elements 722 with bushing elements 724 interleaved or otherwise disposed between adjacent ones of bushing elements 722.

It will be appreciated that bushing elements 720 and 722 as well as bushing elements 724, if included, can be formed from any suitable material or combination of materials. In a preferred arrangement, bushing elements 720 and 722 as well as bushing elements 724, if included, can be formed from an elastomeric material, such as a natural rubber, a synthetic rubber and/or a thermoplastic elastomer. As one example, such an elastomeric material could have a Shore A durometer within a range of approximately 50 to approximately 90.

It will be appreciated that bushing elements 720 and 722 as well as bushing elements 724, if included, can be secured on or along flange portion 714 of inner mounting element 708 in any suitable manner. In some cases, one or more of the bushing elements can be removably attached to the flange portion of the inner mounting element. In a preferred arrangement, however, some or all of bushing elements 720 and 722 as well as bushing elements 724, if provided, can be permanently attached (i.e., inseparable without damage, destruction or material alteration of at least one of the component parts) to flange portion 714. It will be appreciated that such permanent joints or connections can be formed by way of any one or more processes and/or can include the use of one or more treatments and/or materials. Non-limiting examples of suitable processes can include molding, adhering, curing and/or vulcanizing processes.

In some cases, bushing elements 720 and 722 as well as bushing elements 724, if included, can be disposed within one or more pockets or recesses formed within the inner mounting element. In such cases, the combination of bushing elements and recess walls can be configured to provide a desired combination of spring rate, deflection and/or other performance characteristics. In the arrangement shown in FIGS. 7 and 9, inner mounting element 708 can include a first plurality of recesses 726 that extend into flange portion 714 from along first side 716. In a preferred arrangement, recesses 726 are dimensioned to receive and engage bushing elements 720. Additionally, or in the alternative, inner mounting element 708 can include a second plurality of recesses 728 can extend into flanged portion 714 from along second side 718. In a preferred arrangement, recesses 728 are dimensioned to receive and engage bushing elements 722.

Additionally, in a preferred arrangement, the quantity of recesses 726 and 728 can, at a minimum, correspond to the quantity of bushing elements 720 and 722 included in end mount assembly 700. Furthermore, recesses 726 and 728 can be disposed in an approximately uniform spacing or pattern about axis AX and/or along the respective side of the flange portion of inner mounting element 708. Further still, in a preferred arrangement, recesses 726 and 728 can be arranged on opposing sides of flange portion 714 in an interleaved or otherwise alternating pattern or configuration with respect to one another, as discussed above in connection with bushing elements 720 and 722. It will be appreciated, however, that other configurations and/or arrangements could alternately be used.

During use, end mount assembly 700 can permit damper rod 602 to pivot or otherwise move by displacing inner mounting element 708 relative to mounting bracket 702. Such movement of inner mounting element 708 can compress one or more of bushing elements 720 into abutting engagement with mounting bracket 702 and can urge one or more of bushing elements 722 into abutting engagement with end member 300. As displacement of inner mounting element 708 by damper rod 602 increases, bushing elements 720 and 722 begin to compress. As the compression continues to increase, one or more of bushing elements 724 can also contact end member 300 thereby increasing the spring rate and/or reducing further deflection of inner mounting element relative to mounting bracket 702.

With reference to FIGS. 13-22, mounting bracket 702 can include a bracket wall 730 that includes a mounting wall portion 732 that can at least partially form an outer periphery of the mounting bracket. An end wall portion 734 can be offset from mounting wall portion 732 with a side wall portion 736 extending between and operatively connecting the end and mounting wall portions. End wall portion 734 can include an inner peripheral edge 738 that at least partially defines an opening or passage 740 through bracket wall 730. Mounting cavity 706 extends into mounting bracket 702 from along mounting wall portion 732 and is at least partially defined by end wall portion 734 and side wall portion 736. Mounting bracket 702 can also include one or more mounting features suitable for securing the mounting bracket on or along end member 300. For example, the mounting bracket can include holes 742 extending through mounting wall portion 732 of bracket wall 730 that are dimensioned to receivingly engage sections 322 of mounting studs 312.

Figure 13:
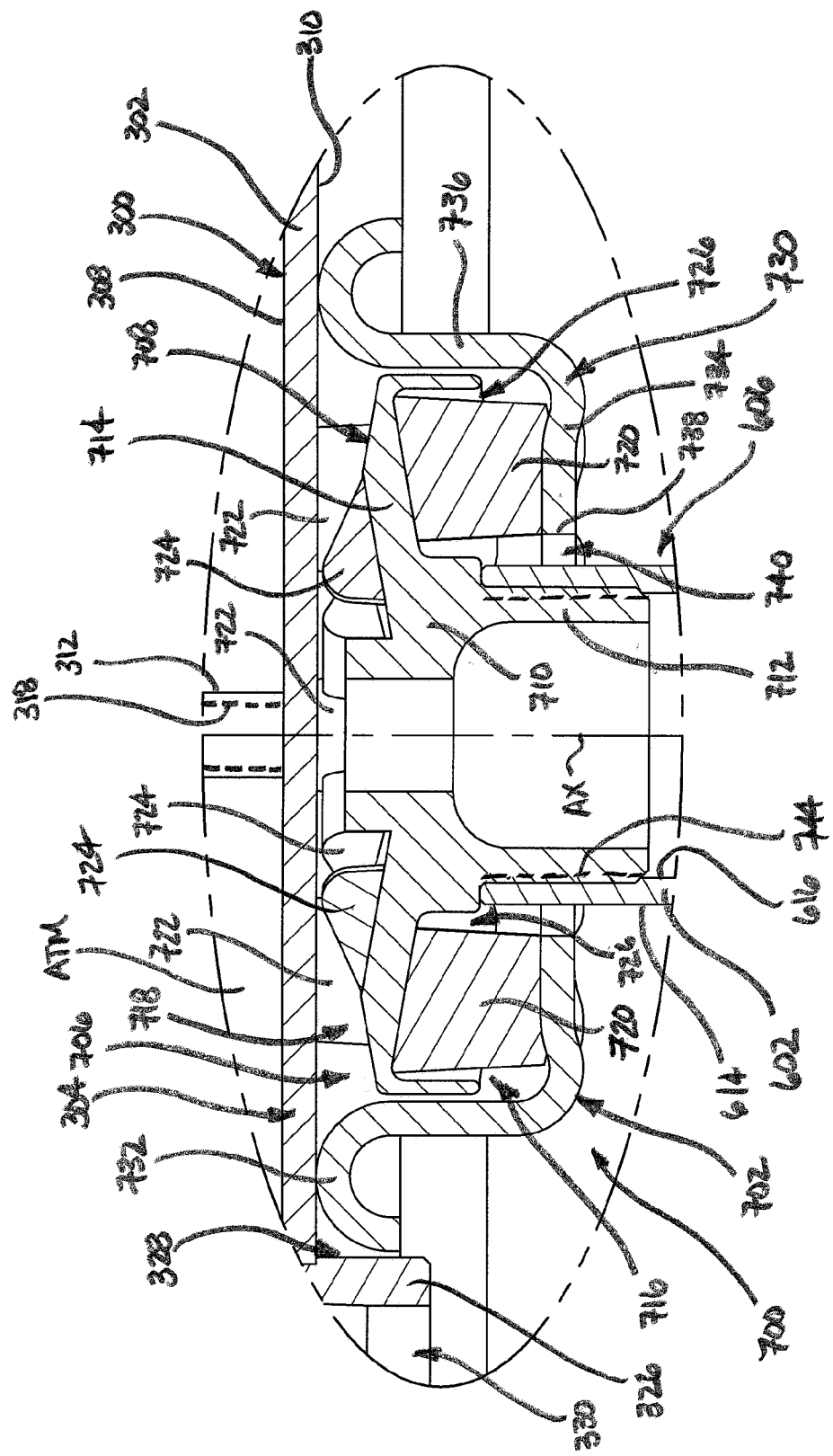
FIG. 13 is a greatly enlarged view of the portion of the exemplary gas spring and damper in FIGS. 2-9 that is identified as Detail 13 in FIG. 7.
Figure 13A:
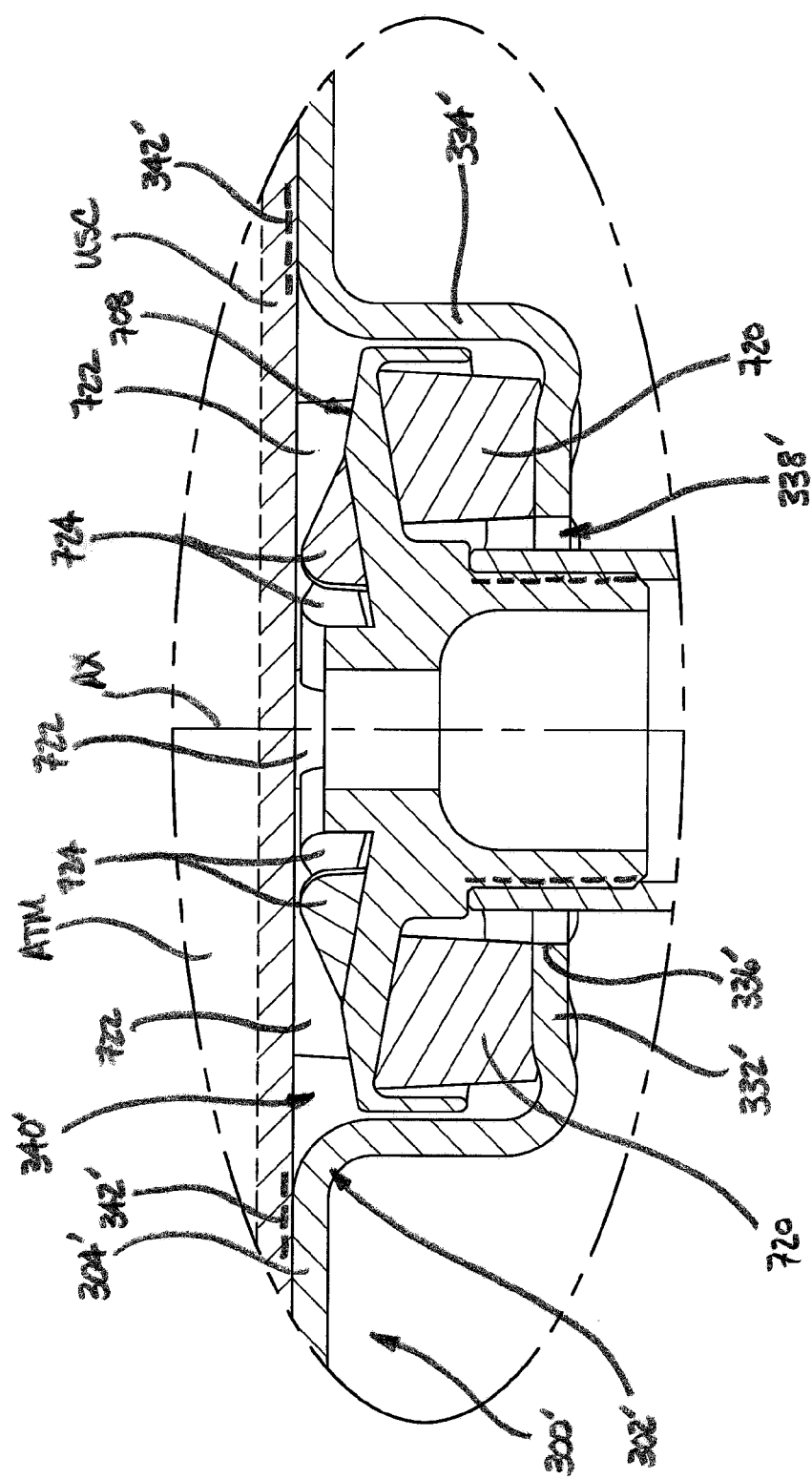
FIG. 13A is an alternate construction of the portion of the exemplary gas spring damper shown in FIG. 13.
Figure 14:
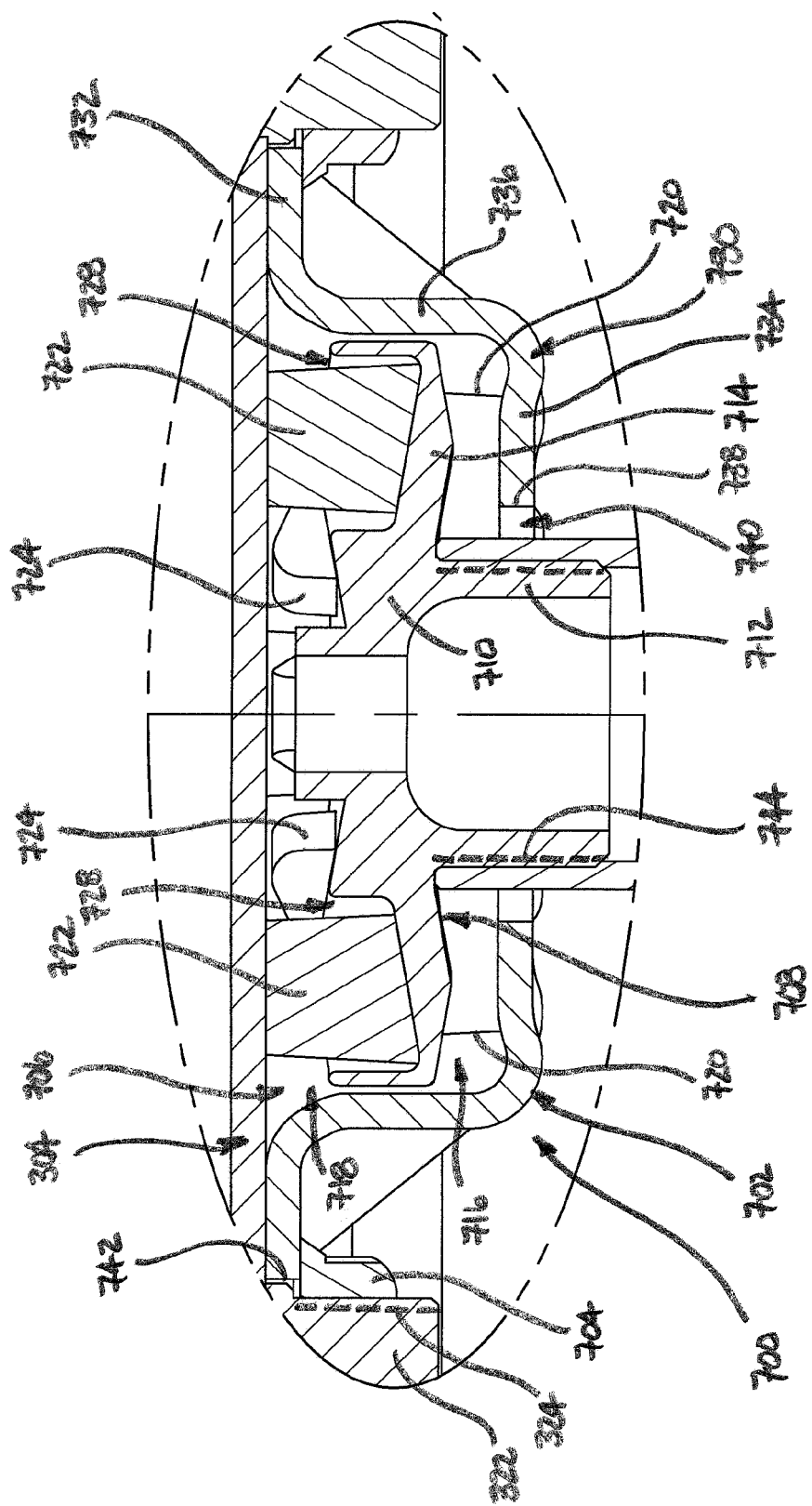
FIG. 14 is a greatly enlarged view of the portion of the exemplary gas spring and damper in FIGS. 2-9 that is identified as Detail 14 in FIG. 9.

In an alternate construction, end mount assembly 700 can utilize a mounting cavity formed between an end member and an associated structural component in place of mounting cavity 706 formed by mounting bracket 702. In such case, end mount assembly 700 can forgo the use of mounting bracket 702. One example of such a construction is shown in FIG. 13A in which inner mounting element 708 as well as busing elements 720, 722 and/or 724 are operatively disposed between an end member 300' and an associated structural component, such as upper structural component USC, for example. It will be appreciated that end member 300' can include any one or more features and/or elements described above in connection with end member 300, such as an end member wall 302' that includes an inner wall portion 304' as well as an end wall portion 332' that is offset from inner wall portion 304' such that a side wall portion 334' extends between and operatively connects the inner wall and end wall portions. End wall portion 332' can include an inner peripheral edge 336' that at least partially defines an opening or passage 338' through end member wall 302'. A mounting cavity 340' extends into end member 300' from along inner wall portion 304' and is at least partially defined by end wall portion 332' and side wall portion 334'.

It will be appreciated that mounting cavity 340' is disposed in fluid communication with spring chamber 202 through opening 338'. In some cases, a substantially fluid-tight seal or joint can be disposed between end member 300' and upper structural component USC to substantially inhibit or at least reduce inadvertent pressurized gas transfer from spring chamber 202 to external atmosphere ATM. Such substantially a fluid-tight seal or joint is schematically represented in FIG. 13A by dashed lines 342'. It will be appreciated that such substantially fluid-tight seal or joint can be of any suitable type, kind and/or construction. As non-limiting examples, one or more sealing elements and/or a flowed-material connection could be used.

With reference, now, to FIGS. 13-16 and 23-28, inner mounting element 708 is shown as including element wall 710 with connector portion 712 that can include one or more helical threads 744 or another suitable feature for operatively connecting elongated damping rod 602 to the connector portion. Element wall 710 also includes flange portion 714, which project radially outward from along connector portion 712. In some cases, a projection 746 can extend axially outward beyond flange portion 714 in a direction opposite connector portion 712. During use, projection 746 can serve as a positive stop by abuttingly engaging end member 300. Additionally, in some cases, projection 746 can include a plurality of sides or flats 748 that can function as engagement features for a tool or other device for use when securing inner mounting element 708 on or along damping rod 602.

As discussed above in detail, inner mounting element 708 can also include first and second pluralities of recesses 726 and 728. As shown, recesses 726 can be dimensioned to receive and engage bushing elements 720 and recesses 728 can be dimensioned to receive and engage bushing elements 722. Bushing elements 724 are shown as being secured on or along an outer surface 750 of flange portion 714. In an installed and assembled (but uncompressed) condition on inner mounting element 708, bushing elements 720, 722 and 724 can have a profile protruding from the recess that is taller towards the center of inner mounting element 708 but decreases in height in a radially-outward direction.

Figure 15:
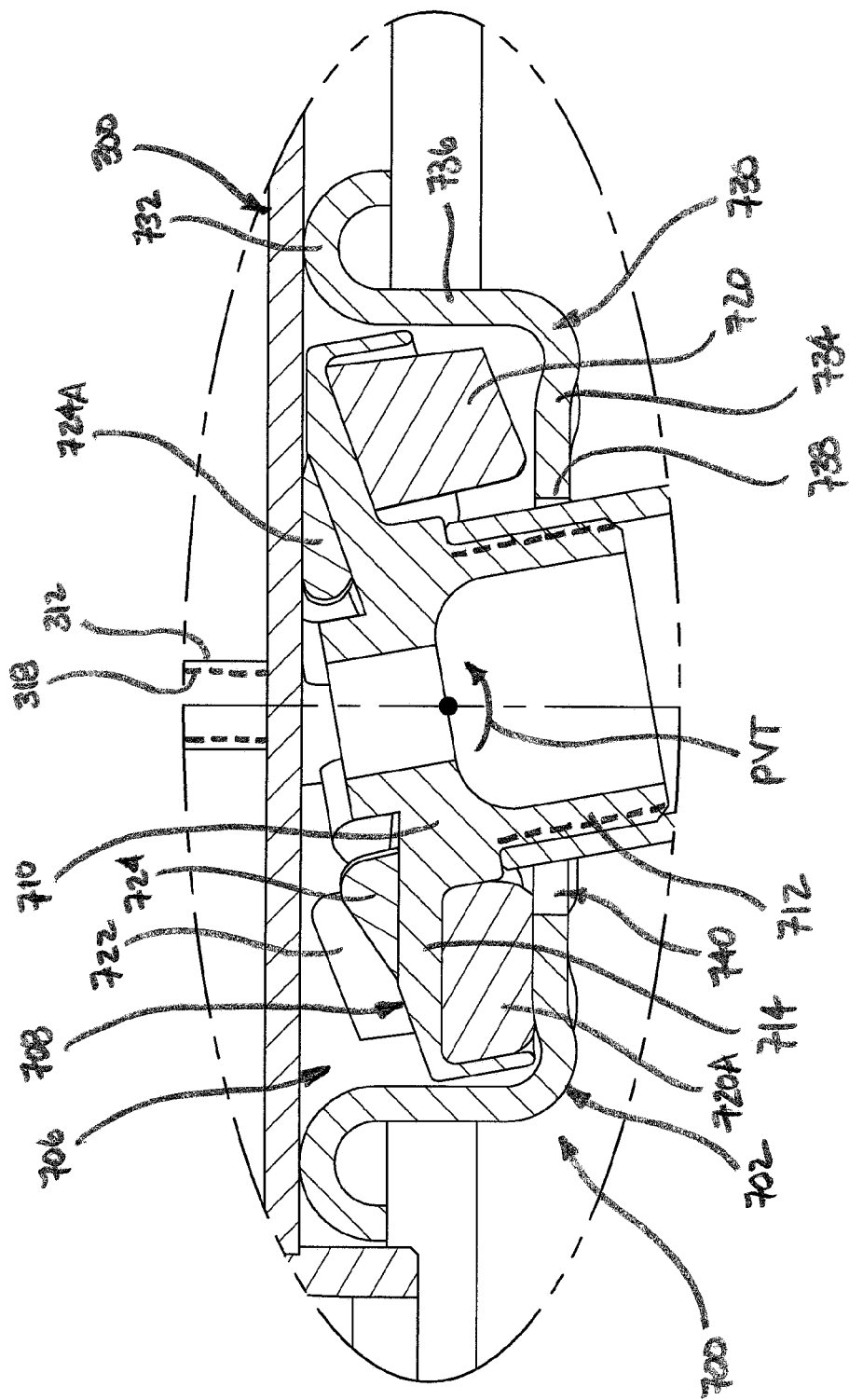
FIG. 15 illustrates the portion of the exemplary gas spring and damper in FIG. 13 shown in a deflected condition of use.
Figure 16:
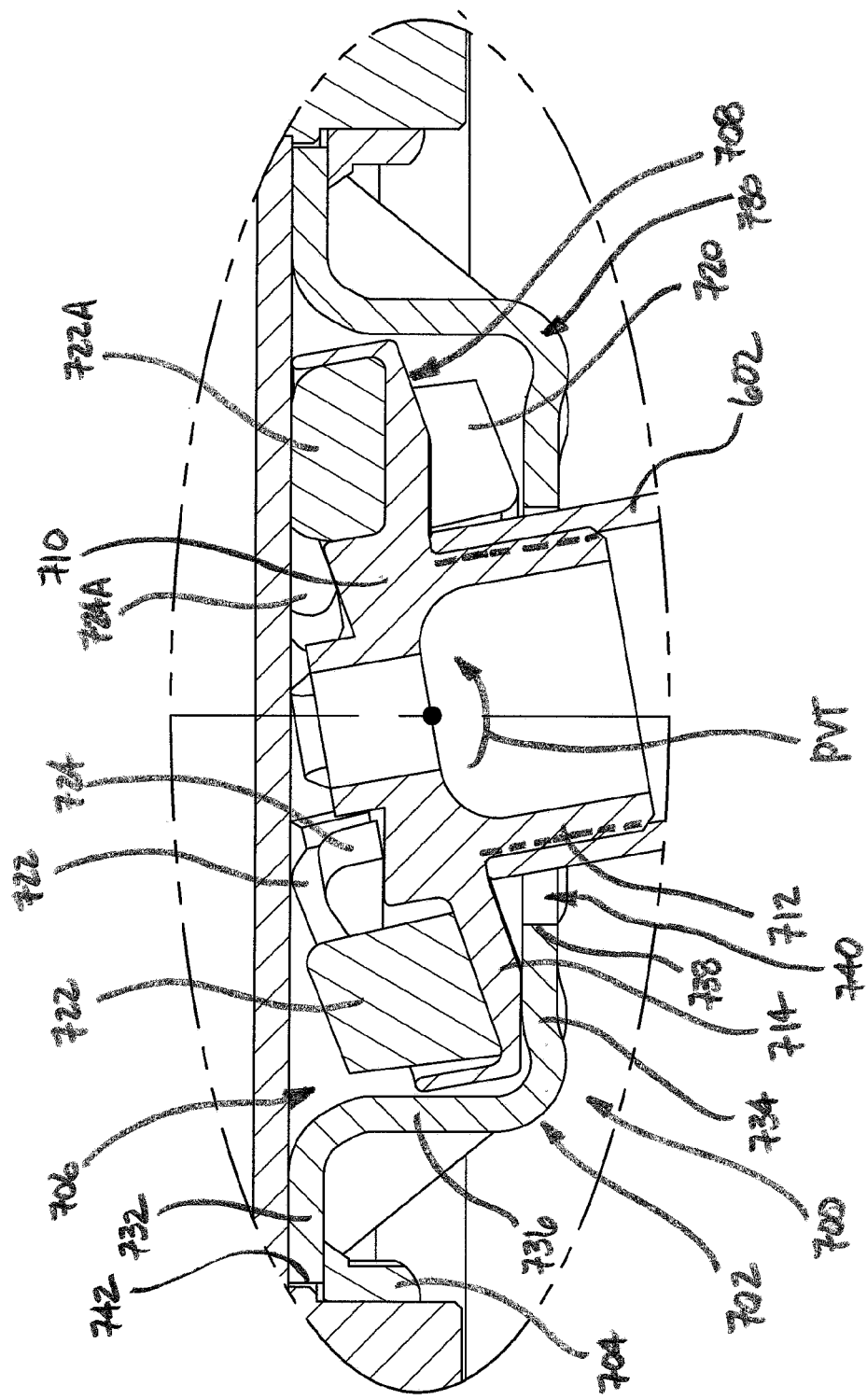
FIG. 16 illustrates the portion of the exemplary gas spring and damper in FIG. 14 shown in a deflection condition of use.
Figure 17:
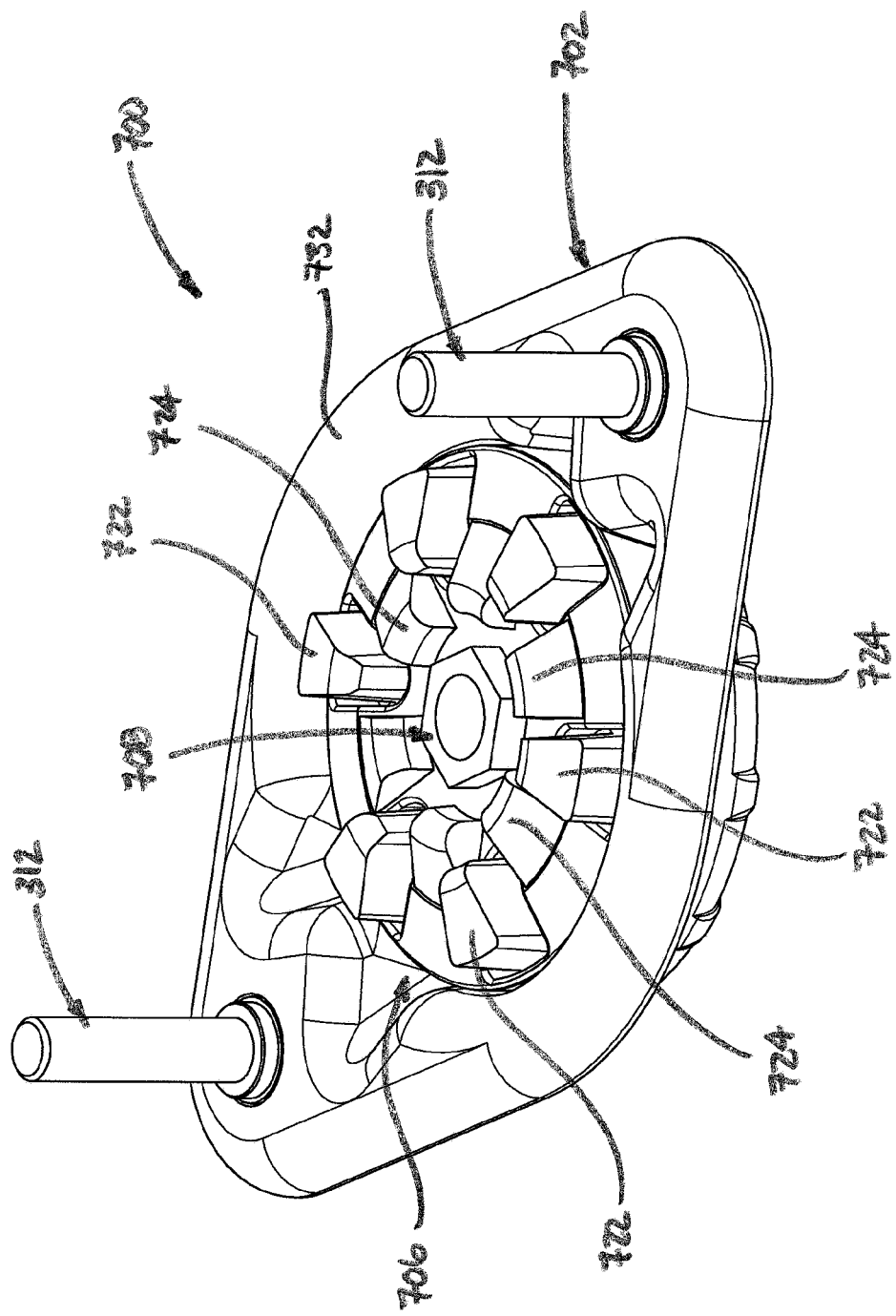
FIG. 17 is a top perspective view of one example of an end mount assembly in accordance with the subject matter of the present disclosure, such as is shown in FIGS. 2-9 and 13-16.
Figure 18:
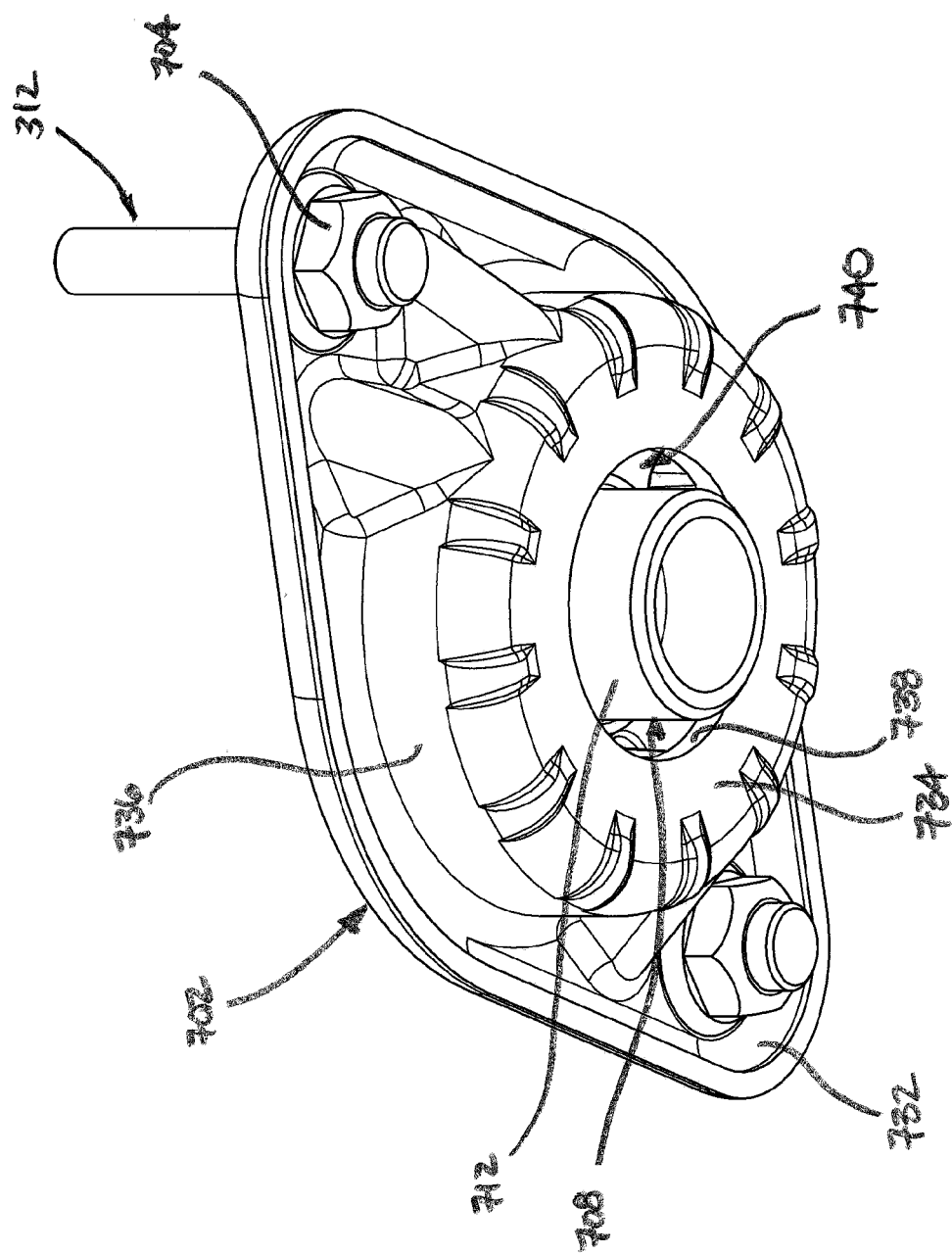
FIG. 18 is a bottom perspective view of the exemplary end mount assembly in FIG. 17.

Additionally, bushing elements 720 and 722 are cooperatively dimensioned with recesses 726 and 728 such that a gap is formed along at least one side or surface of the bushing elements. Such a construction allows the bushing elements to expand during compression, as identified in FIGS. 15 and 16 as bushing elements 720A and 722A (and 724A), for example. During use in a deflected condition, as is represented in FIGS. 15 and 16 by arrow PVT, for example, the size, shape and profile of the bushings combined with the gap formed with the side wall portions of the recesses can minimize or at least reduce the reaction moment generated during nominal angular misalignment. During angular misalignment, some of the bushing elements (e.g., bushing elements 720A, 722A and 724A) are compressed on half of one side while some of the bushing elements are compressed on the opposite half of the other side. When locally high bushing element loads result in high compression, the bushing elements contact the pocket wall & the local spring rate of the bushing element progressively increases. This is especially beneficial when maximum jounce & rebound loads are transmitted though the mount which can cushion the load prior to contacting a positive stop. Additional snubber bushing elements (e.g., bushing elements 724) can reside on either side of the insert outside of the pockets to provide further load build up.

Figure 19:
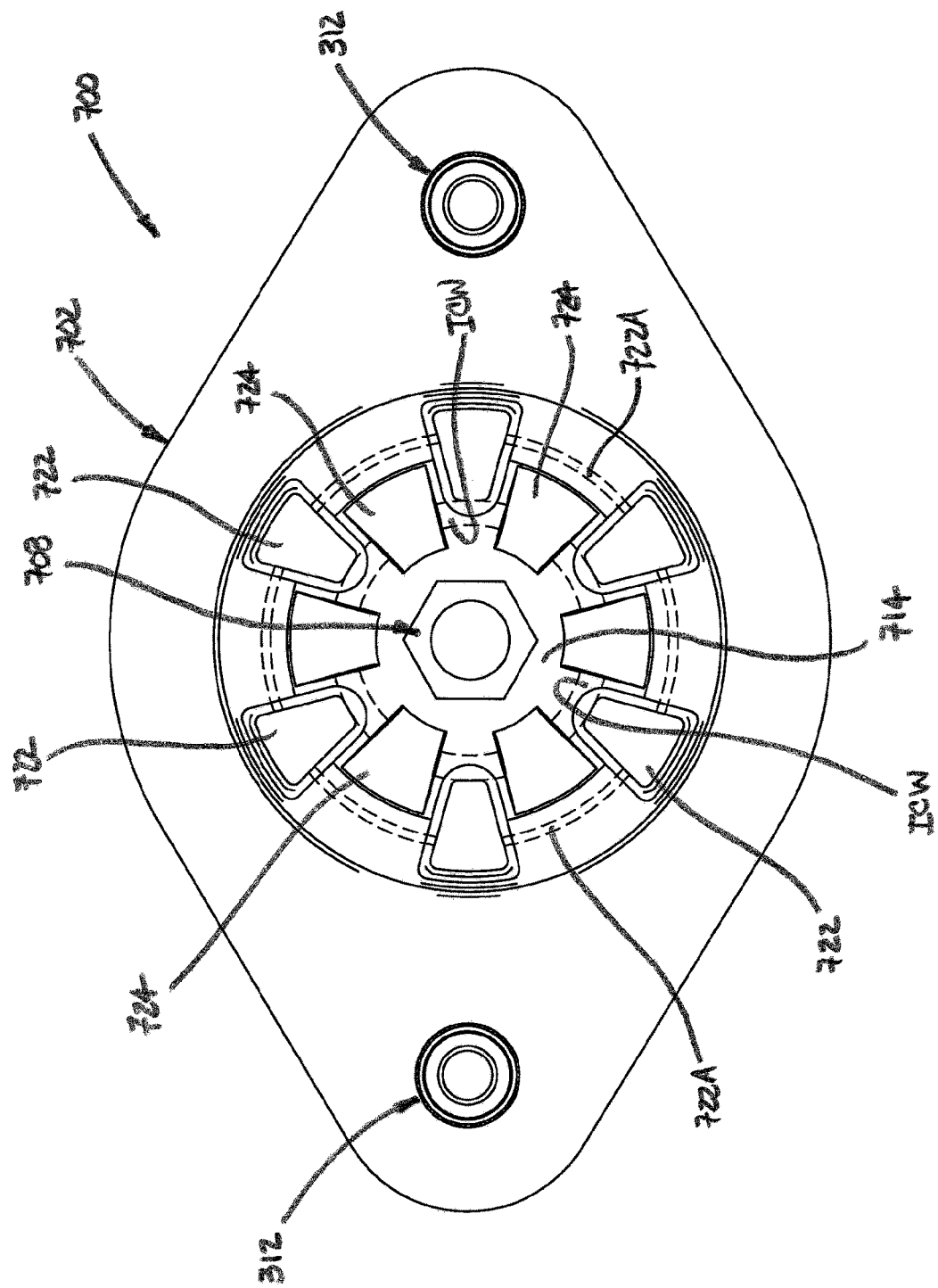
FIG. 19 is a top plan view of the exemplary end mount assembly in FIGS. 17 and 18.
Figure 20:
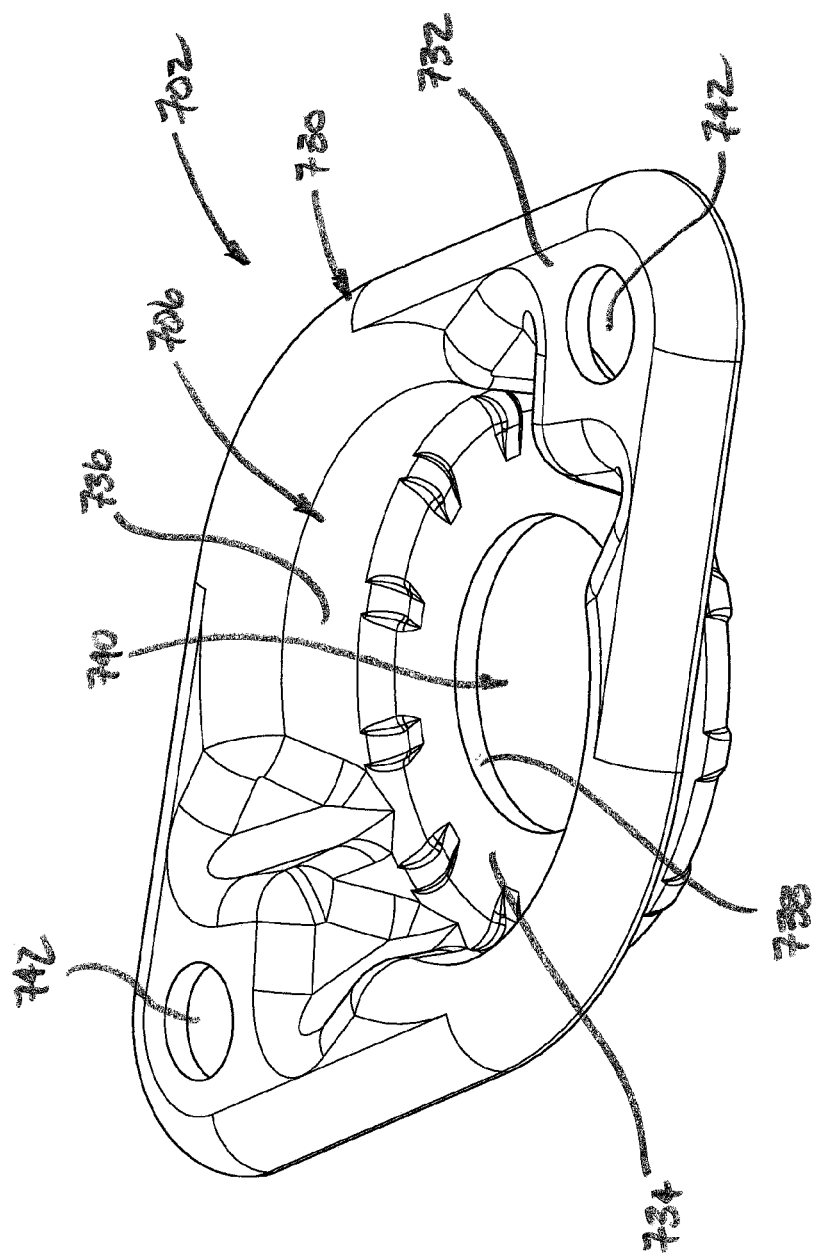
FIG. 20 is a top perspective view of one example of a mounting bracket of the exemplary end mount assembly in FIGS. 2-9 and 13-19.
Figure 21:
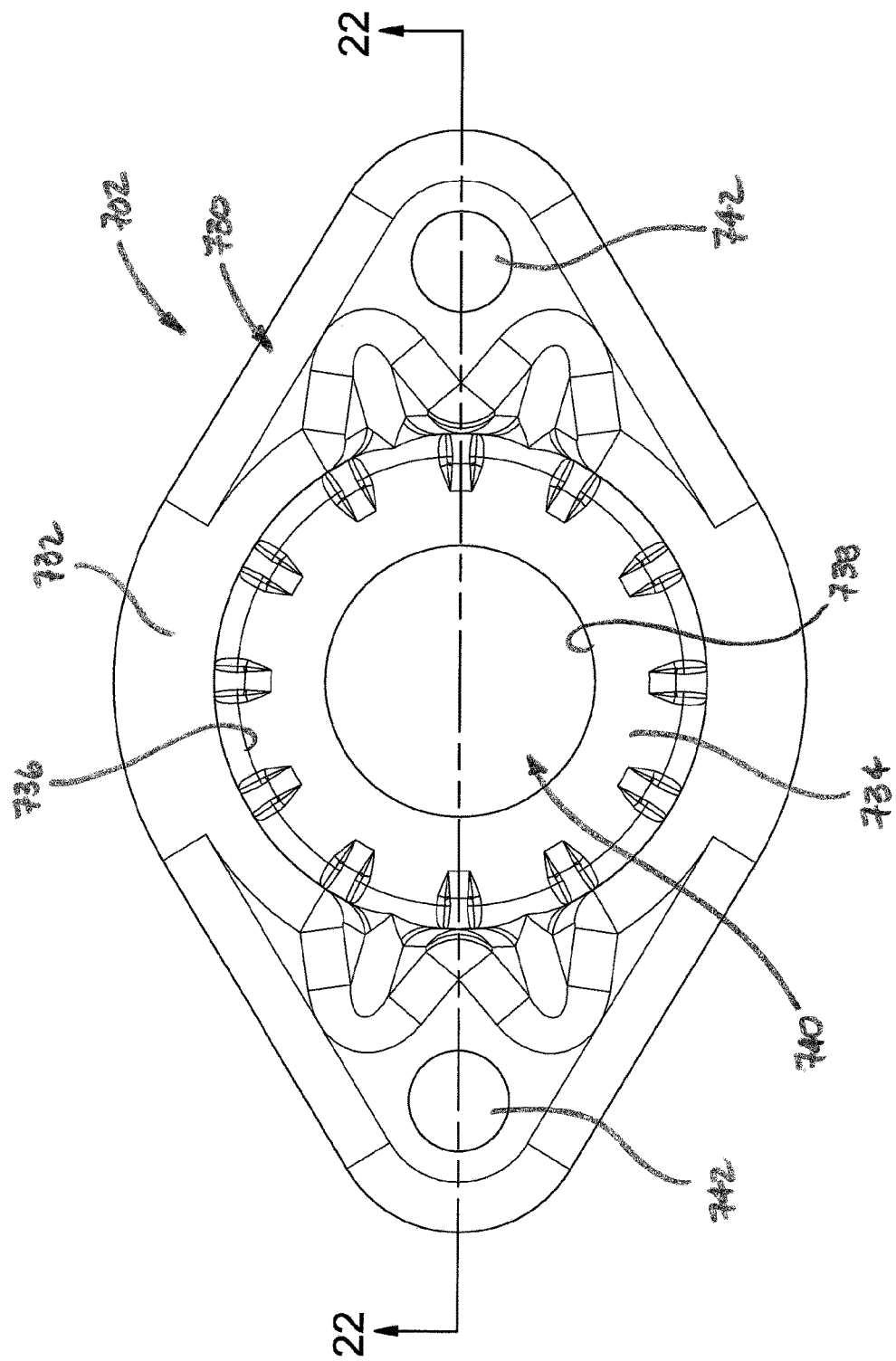
FIG. 21 is a top plan view of the exemplary mounting bracket in FIG. 20.
Figure 22:
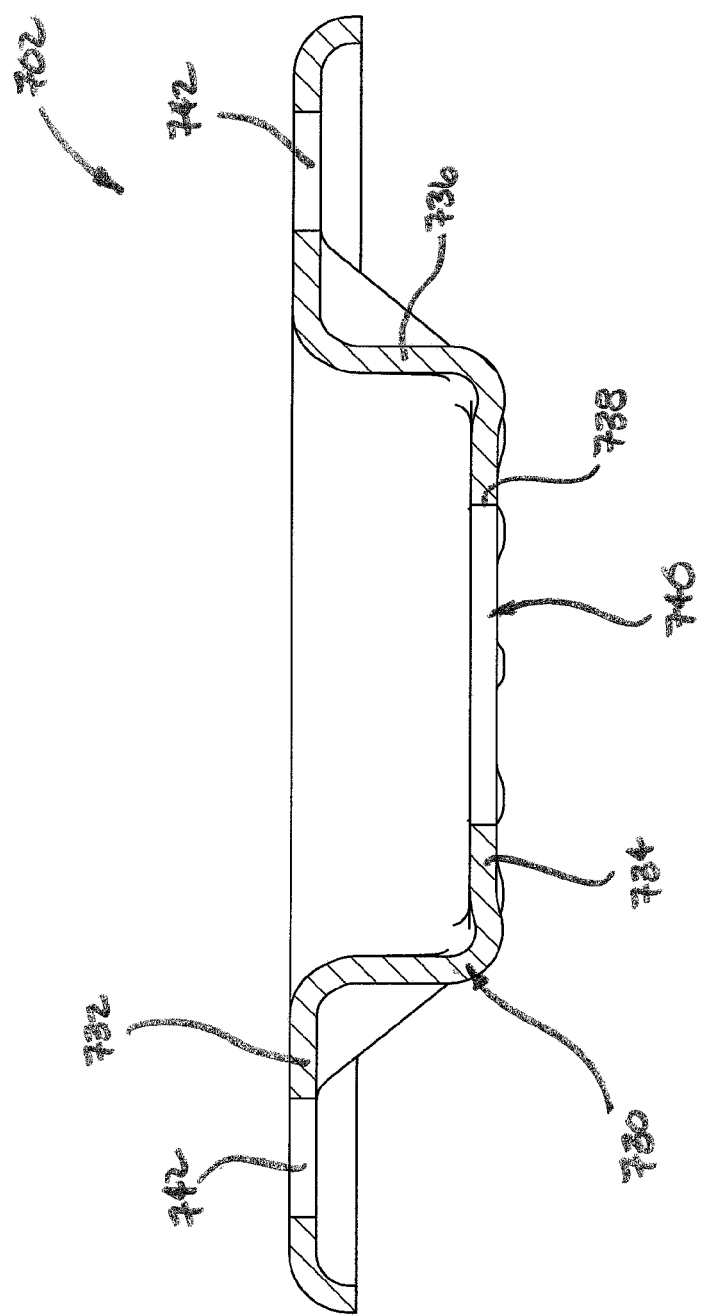
FIG. 22 is a cross-section side view of the exemplary mounting bracket in FIGS. 20 and 21 taken from along line 22-22 in FIG. 21.
Figure 23:
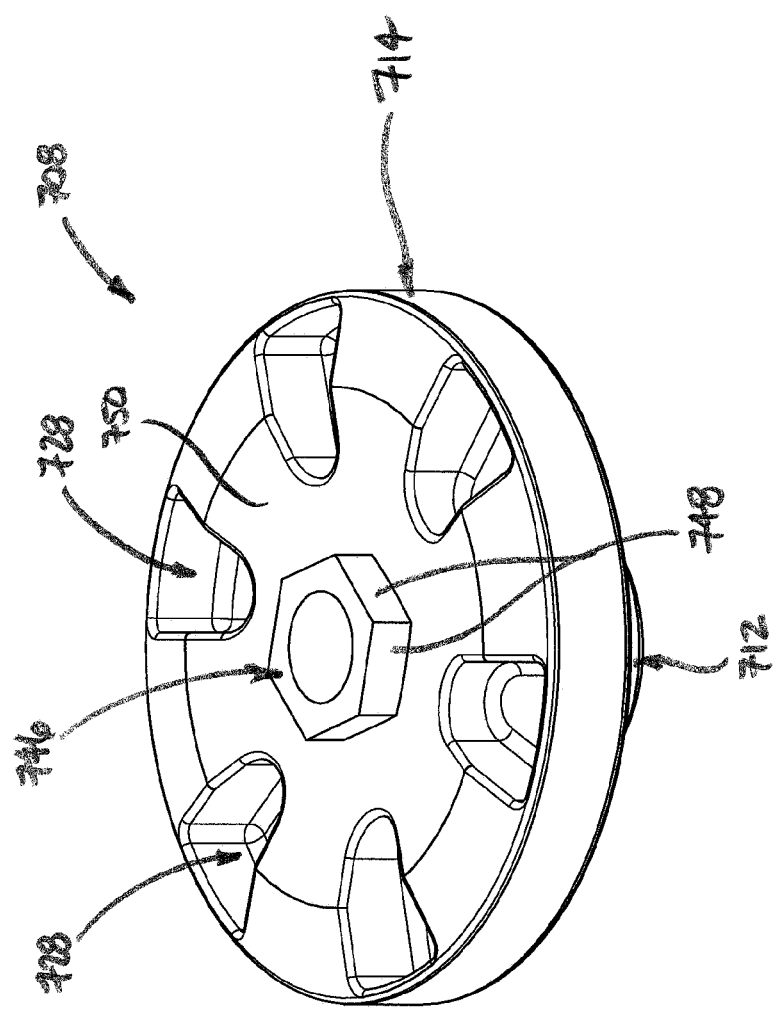
FIG. 23 is a top perspective view of one example of an inner mounting element of the exemplary end mount assembly in FIGS. 2-9 and 13-19.
Figure 24:
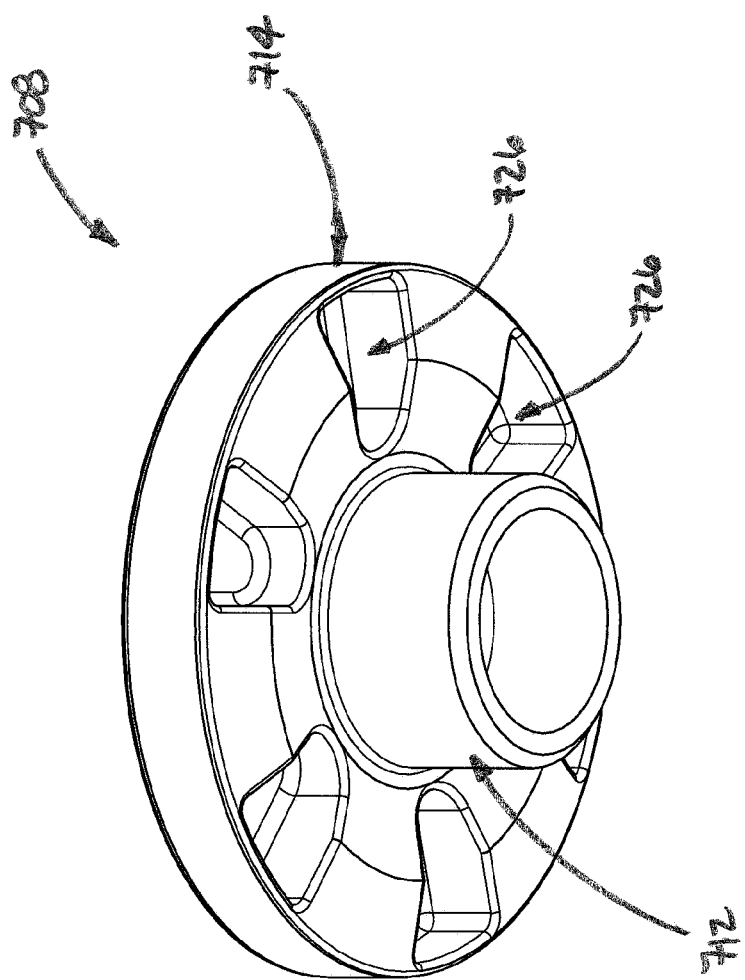
FIG. 24 is a bottom perspective view of the exemplary inner mounting element in FIG. 23.
Figure 25:
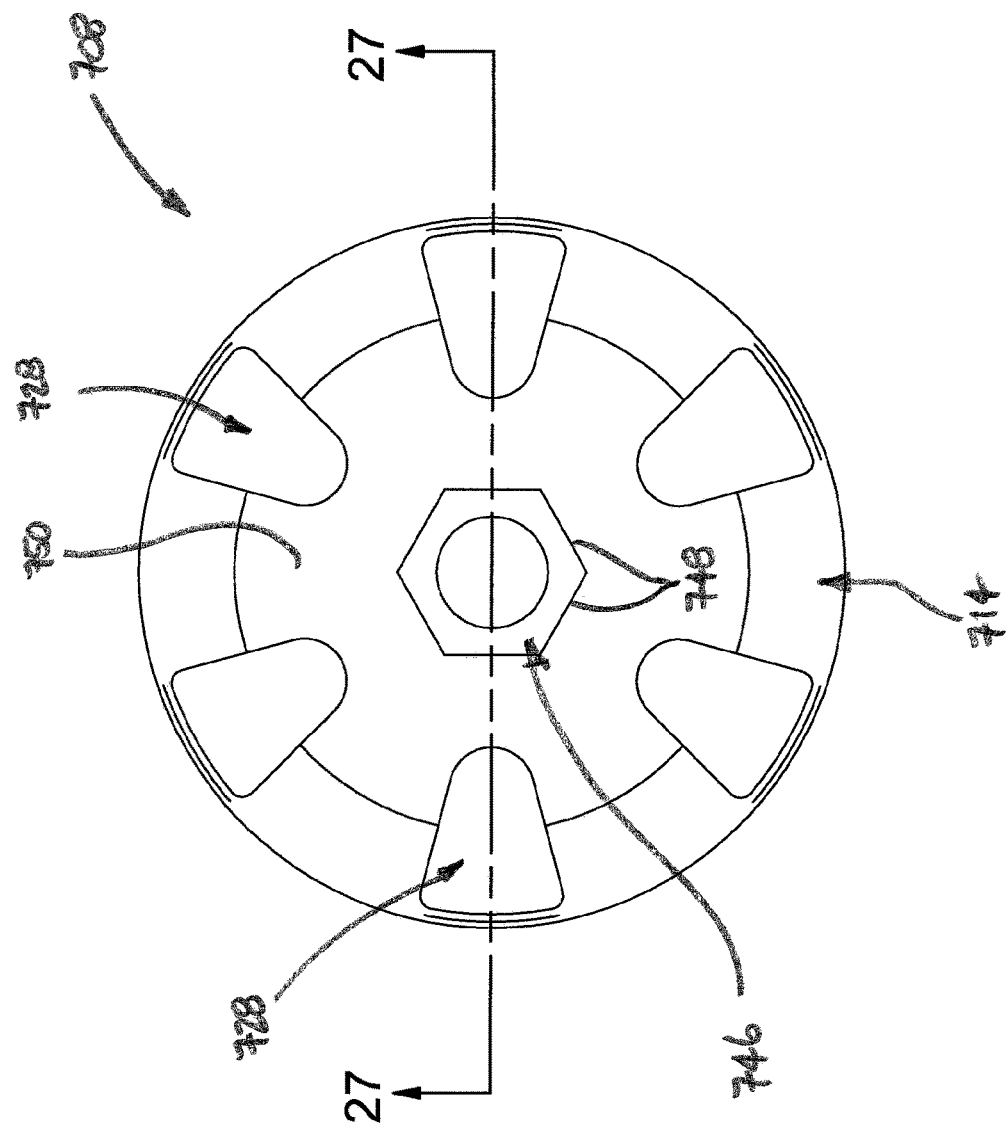
FIG. 25 is a top plan view of the exemplary inner mounting element in FIGS. 23 and 24.
Figure 26:
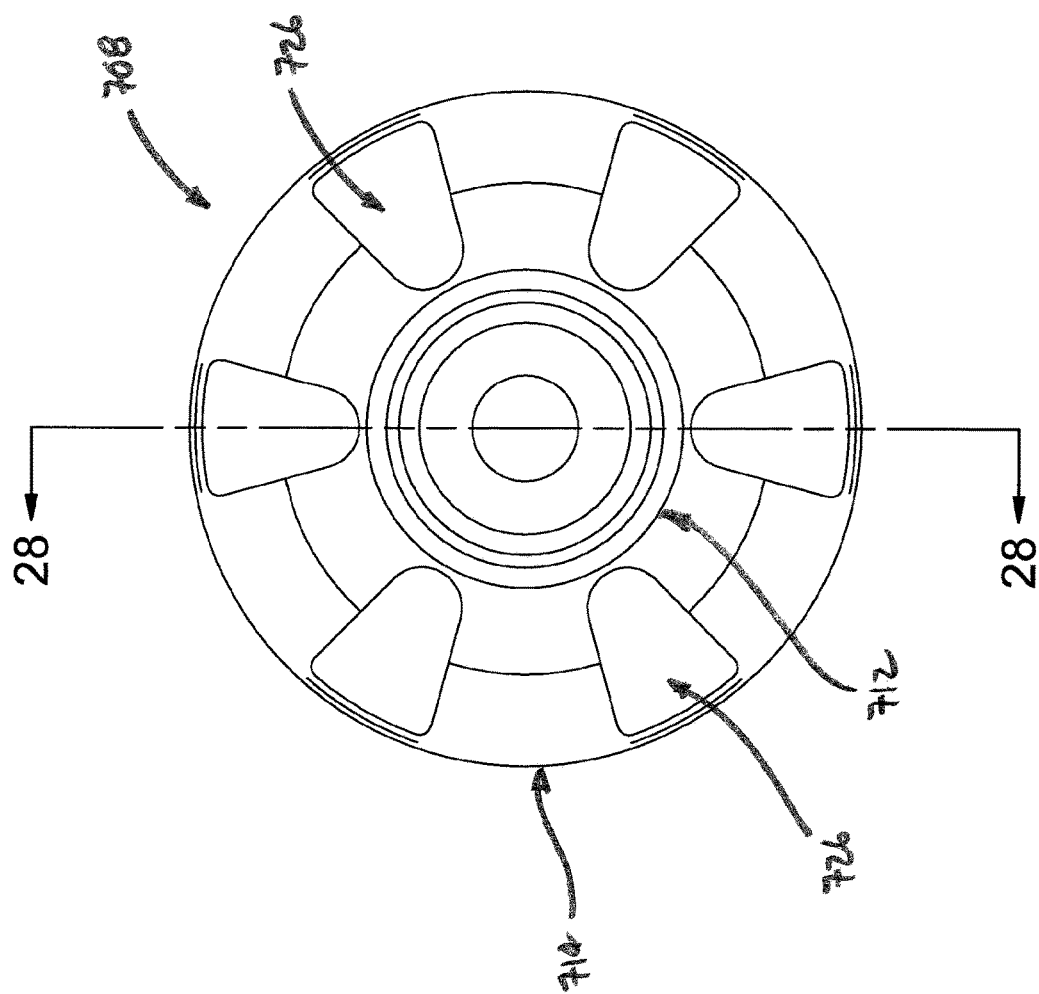
FIG. 26 is a bottom plan view of the exemplary inner mounting element in FIGS. 23-25.
Figure 27:
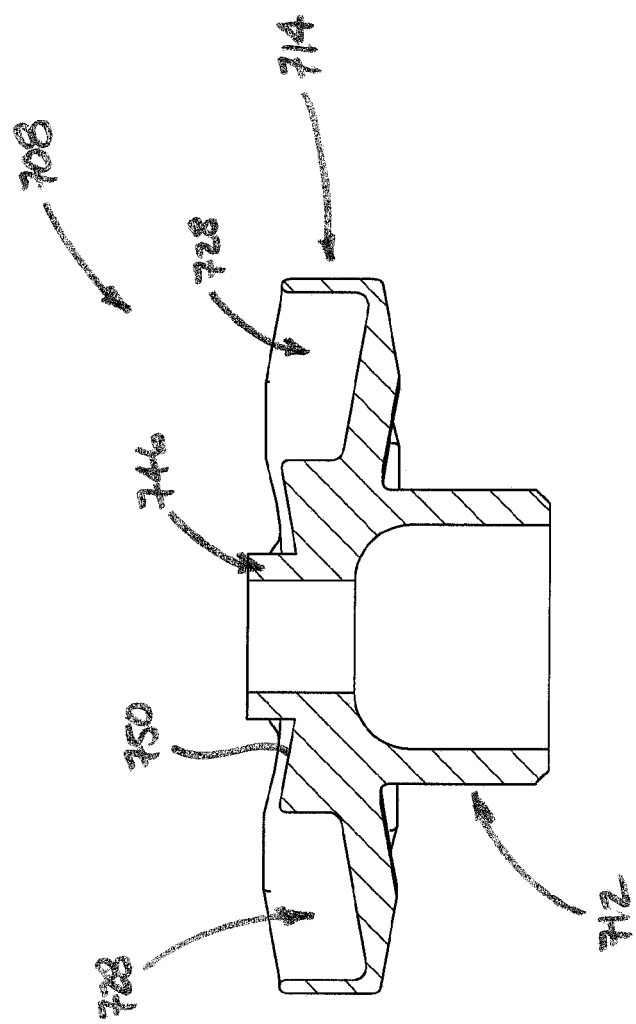
FIG. 27 a cross-sectional side view of the exemplary inner mounting element in FIGS. 23-26 taken from along line 27-27 in FIG. 25.
Figure 28:
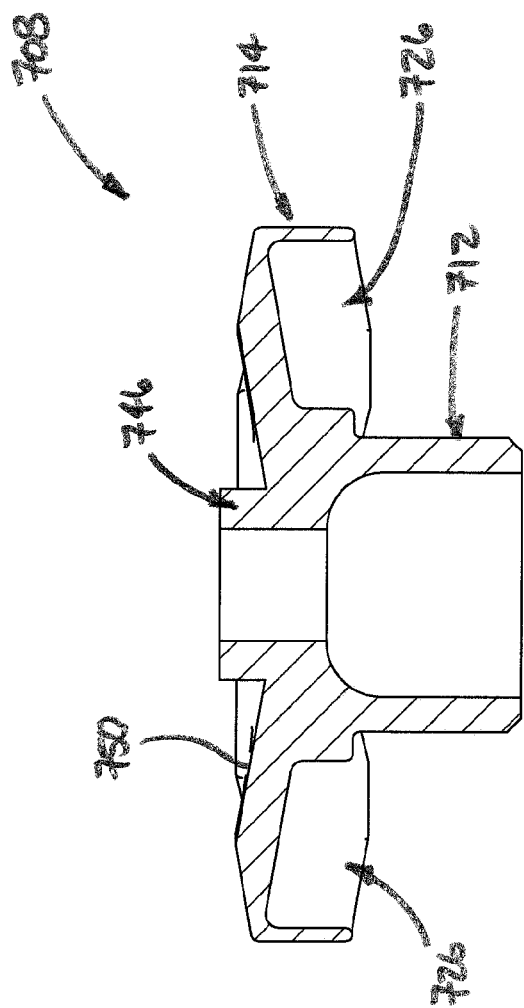
FIG. 28 a cross-sectional side view of the exemplary inner mounting element in FIGS. 23-27 taken from along line 28-28 in FIG. 26.
Figure 29:
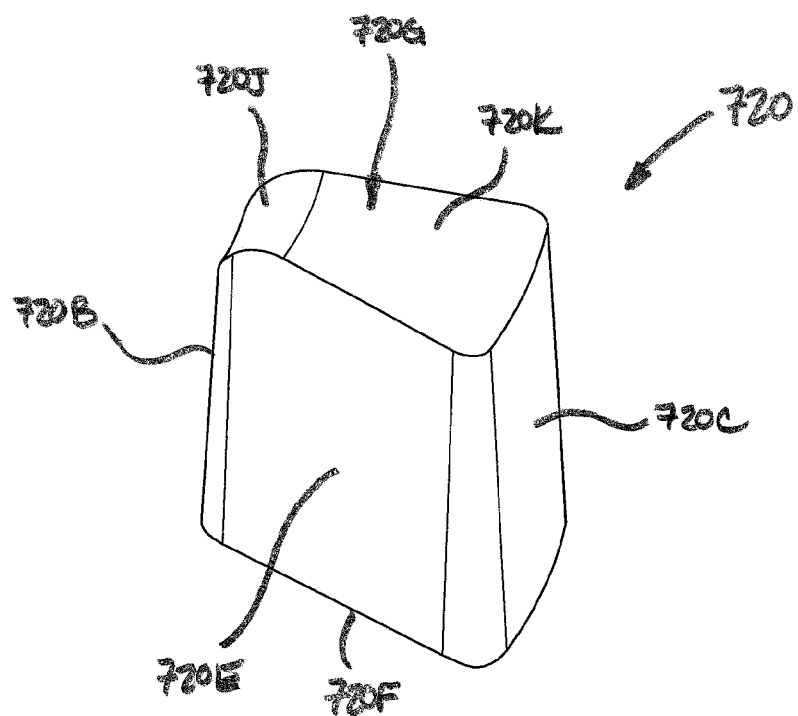
FIG. 29 is a top perspective view of one example of a bushing element of the exemplary end mount assembly in FIGS. 2-9 and 13-19.
Figure 30:
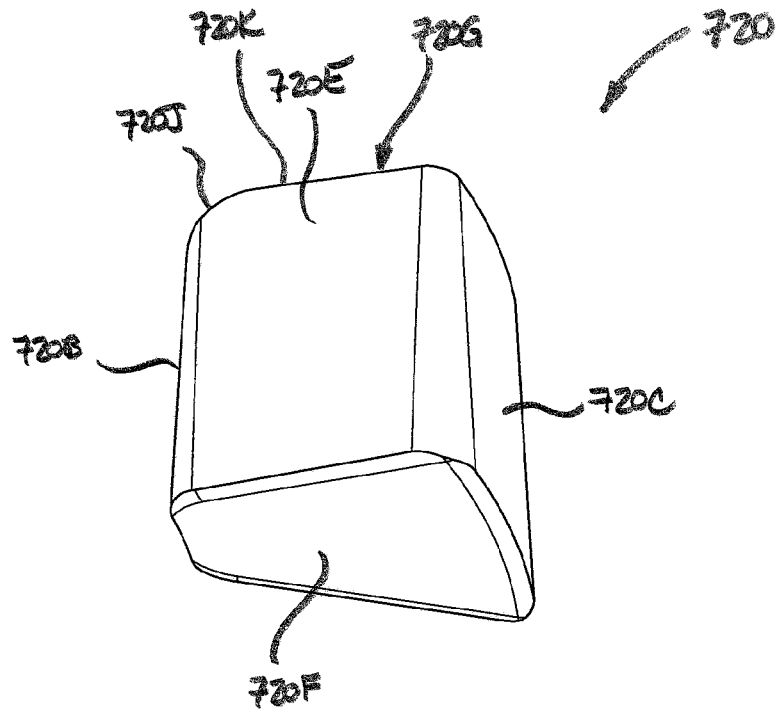
FIG. 30 is a bottom perspective view of the exemplary bushing element in FIG. 29.
Figure 31:
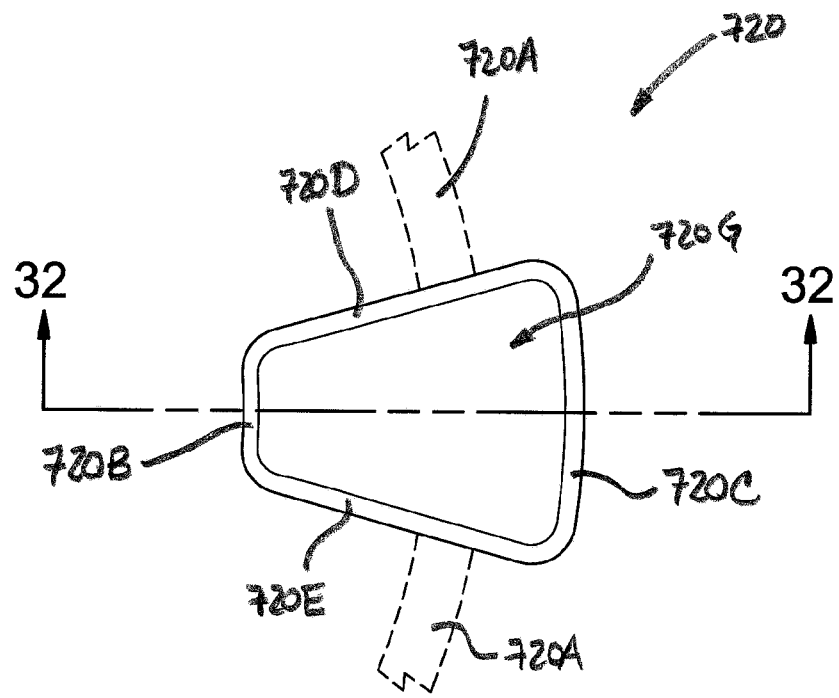
FIG. 31 is a top plan view of the exemplary bushing element in FIGS. 29 and 30.
Figure 32:
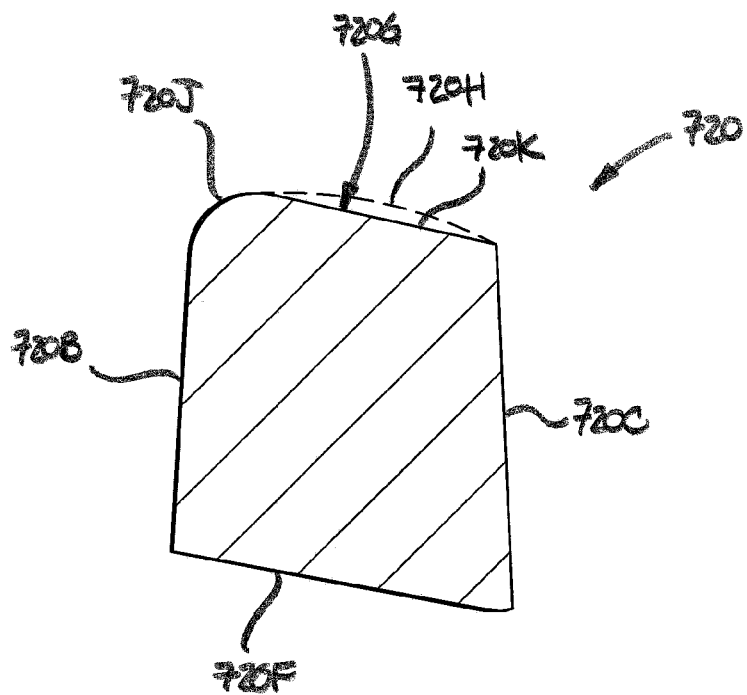
FIG. 32 a cross-sectional side view of the exemplary bushing element in FIGS. 29-31 taken from along line 32-32 in FIG. 31.
Figure 33:
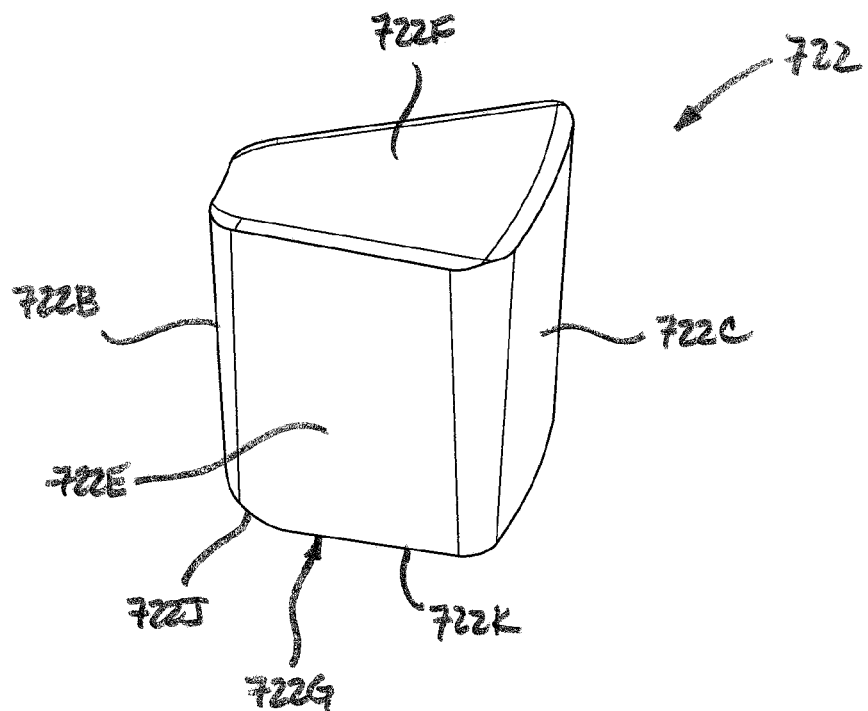
FIG. 33 is a top perspective view of another example of a bushing element of the exemplary end mount assembly in FIGS. 2-9 and 13-19.
Figure 34:
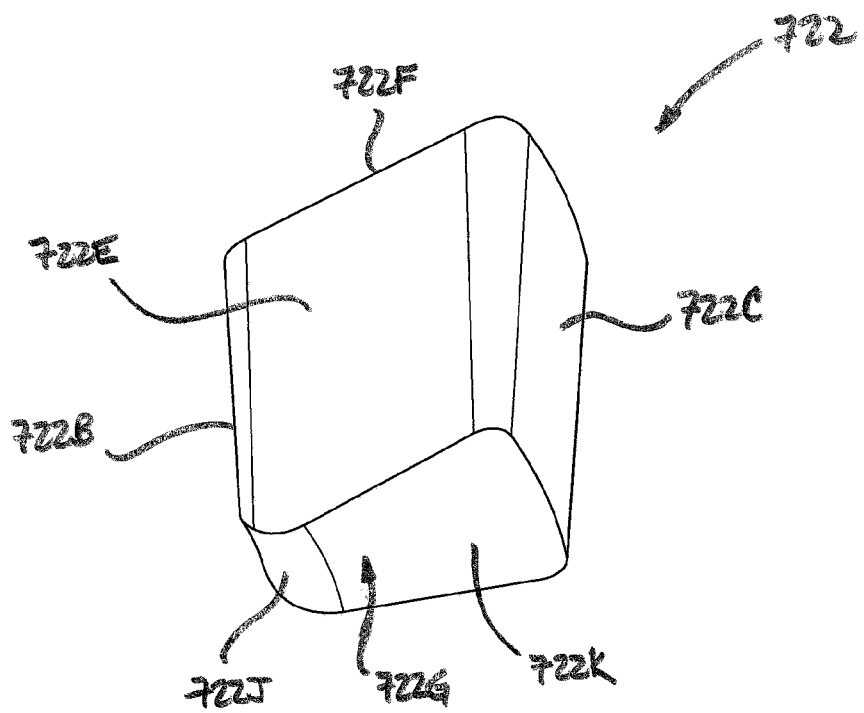
FIG. 34 is a bottom perspective view of the exemplary bushing element in FIG. 33.
Figure 35:
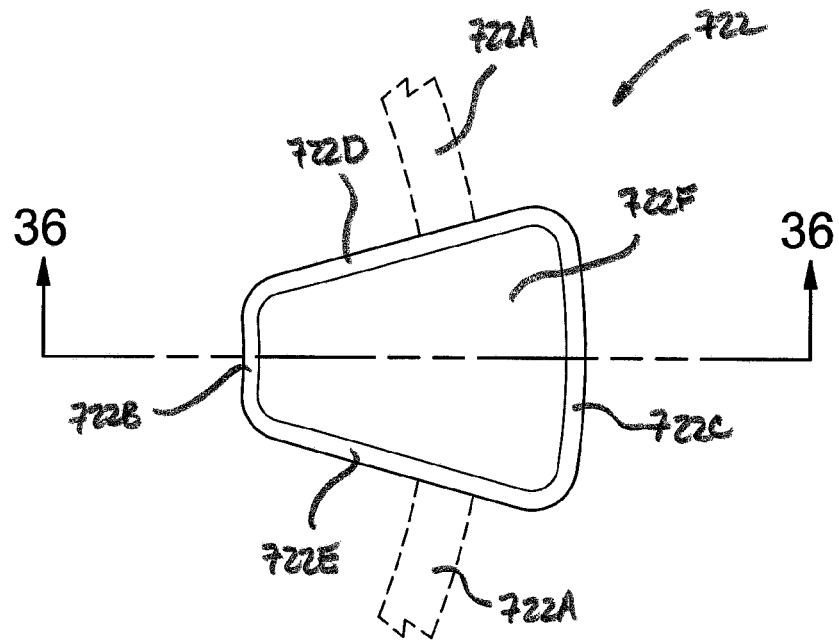
FIG. 35 is a top plan view of the exemplary bushing element in FIGS. 33 and 34.
Figure 36:
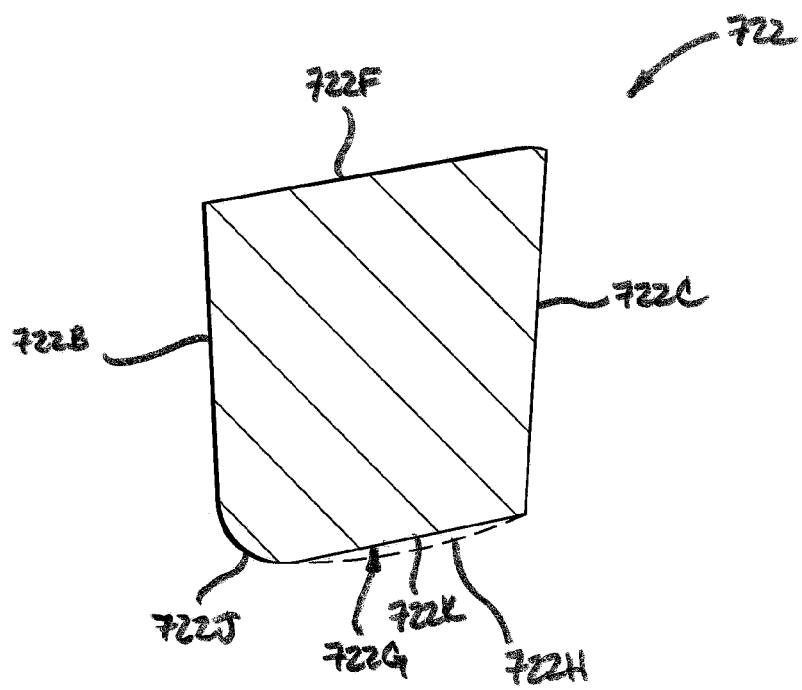
FIG. 36 a cross-sectional side view of the exemplary bushing element in FIGS. 33-35 taken from along line 36-36 in FIG. 35.
Figure 37:
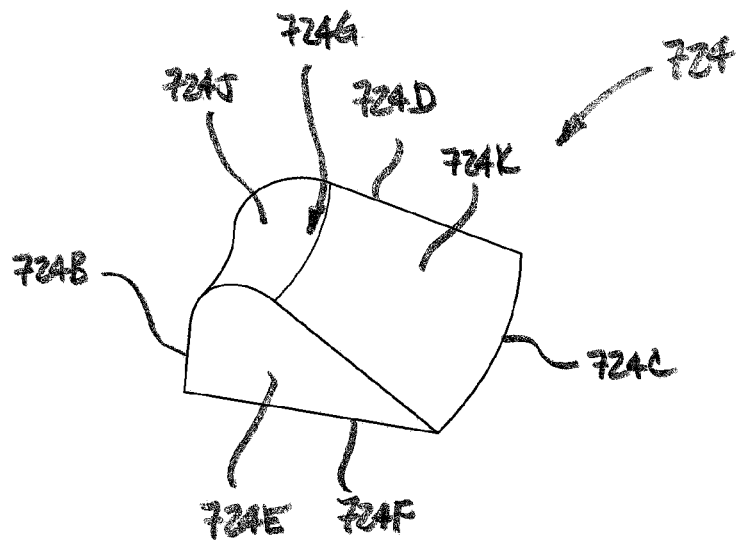
FIG. 37 is a top perspective view of a further example of a bushing element of the exemplary end mount assembly in FIGS. 2-9 and 13-19.
Figure 38:
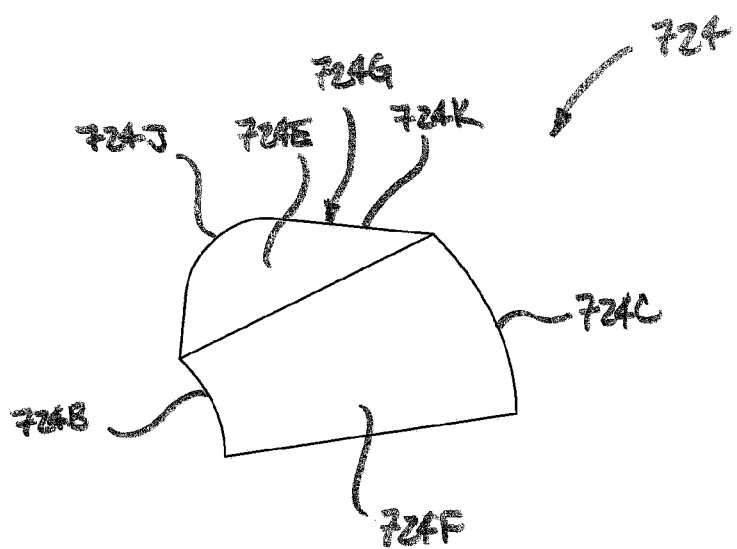
FIG. 38 is a bottom perspective view of the exemplary bushing element in FIG. 37.
Figure 39:
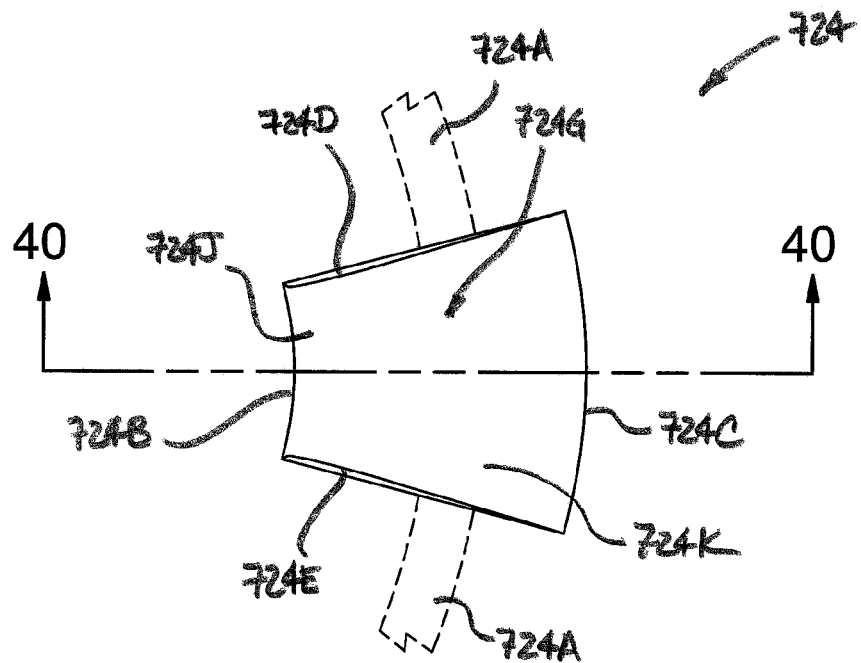
FIG. 39 is a top plan view of the exemplary bushing element in FIGS. 37 and 38.
Figure 40:
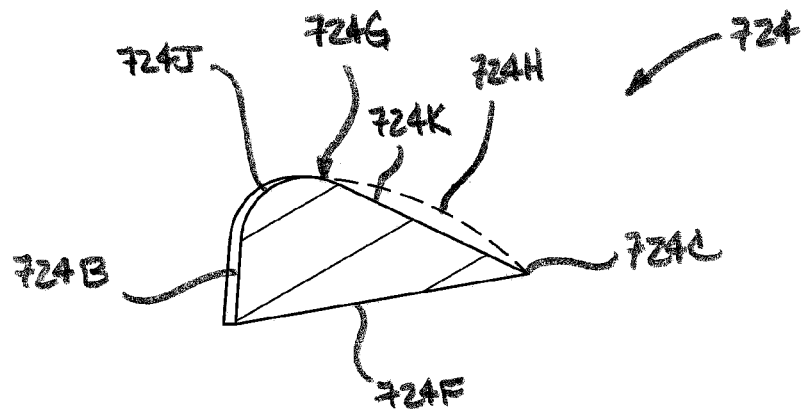
FIG. 40 a cross-sectional side view of the exemplary bushing element in FIGS. 37-39 taken from along line 40-40 in FIG. 39.

It will be appreciated that bushing elements can be provided in any one or more of a variety of manners. In some cases, for example, bushing elements 720, bushing elements 722 and/or bushing elements 724 can be formed as individual elements that are separate from one another. In other cases, bushing elements 720 can be interconnected with one another, such as by way of interconnecting wall segments 720A. Additionally, or as an alternative, bushing elements 722 can be interconnected with one another, such as by way of interconnecting wall segments 722A. Furthermore, or as a further alternative, bushing elements 724, if provided, can be interconnected with one another, such as by way of interconnecting wall segments 724A. In some cases, two or more sets of bushing elements can be operatively connected with one another. For example, as is represented in FIG. 19, interconnecting wall segments ICW can extend between and operatively interconnect bushing elements 722 and 724.

As identified in FIGS. 29-32, bushing elements 720 can include an element body with an inner surface portion 720B and an outer surface portion 720C facing generally opposite the inner surface portion. The element body of bushing elements 720 also includes a first side surface portion 720D and a second side surface portion 720E facing opposite the first side surface portion at an included angle relative thereto. The element body of bushing elements 720 also includes a mounting surface portion 720F and a contact surface portion 720G. In some cases, contact surface portion 720G can have a curved cross-sectional profile along a substantial section thereof, such as is represented by dashed line 720H. In other cases, contact surface portion 720G can have a cross-sectional profile that includes a curved profile section 720J disposed toward inner surface portion 720B and an approximately linear profile section 720K extending toward outer surface portion 720C from along the curved profile section.

As identified in FIGS. 33-36, bushing elements 722 can include an element body with an inner surface portion 722B and an outer surface portion 722C facing generally opposite the inner surface portion. The element body of bushing elements 722 also includes a first side surface portion 722D and a second side surface portion 722E facing opposite the first side surface portion at an included angle relative thereto. The element body of bushing elements 722 also includes a mounting surface portion 722F and a contact surface portion 722G. In some cases, contact surface portion 722G can have a curved cross-sectional profile along a substantial section thereof, such as is represented by dashed line 722H. In other cases, contact surface portion 722G can have a cross-sectional profile that includes a curved profile section 722J disposed toward inner surface portion 722B and an approximately linear profile section 722K extending toward outer surface portion 722C from along the curved profile section.

As identified in FIGS. 37-40, bushing elements 724 can include an element body with an inner surface portion 724B and an outer surface portion 724C facing generally opposite the inner surface portion. The element body of bushing elements 724 also includes a first side surface portion 724D and a second side surface portion 724E facing opposite the first side surface portion at an included angle relative thereto. The element body of bushing elements 724 also includes a mounting surface portion 724F and a contact surface portion 724G. In some cases, contact surface portion 724G can have a curved cross-sectional profile along a substantial section thereof, such as is represented by dashed line 724H. In other cases, contact surface portion 724G can have a cross-sectional profile that includes a curved profile section 724J disposed toward inner surface portion 724B and an approximately linear profile section 724K extending toward outer surface portion 724C from along the curved profile section.

During assembly process, an assembly of inner mounting element 708 with bushing elements 720, 722 and 724 installed can be clamped between mounting bracket 702 end member 300. With fasteners secured and without external loads, the bushing elements are, in a preferred arrangement, axially compressed by an amount within a range of approximately 5 percent to approximately 25 percent.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and damper assembly comprising:
    a gas spring including:
        a flexible spring member having a longitudinal axis and including a flexible wall extending longitudinally between first and second ends and peripherally about said axis to at least partially define a spring chamber;
        a first end member operatively secured to said first end of said flexible spring member such that a substantially fluid-tight seal is formed therebetween; and
        a second end member disposed in spaced relation to said first end member and operatively secured to said second end of said flexible spring member such that a substantially fluid-tight seal is formed therebetween;
    a damper assembly operative to dissipate kinetic energy acting on said gas spring, said damper assembly including a damper housing operatively connected to said second end member and a damper rod assembly operatively engaged with said damper housing for reciprocal motion relative thereto, said damper rod assembly including an elongated damper rod; and,
    an end mount assembly operatively connecting said elongated damper rod and said first end member and permitting said first and second end members to move at least one of laterally and angularly with respect to one another during extension and compression of said gas spring and damper assembly, said end mount assembly including an inner mounting element that includes a mounting element wall with a connector portion dimensioned for operative securement to said elongated damper rod, a flange portion extending radially outward from along said connector portion, and a first plurality of recesses extending into said flange portion of said mounting element wall in a first axial direction.

2. A gas spring and damper assembly according to claim 1, wherein said first plurality of recesses are disposed in peripherally-spaced relation to one another about said axis along a first side of said flange portion.

3. A gas spring and damper assembly according to claim 2, wherein said inner mounting element includes a second plurality of recesses extending into said flange portion of said mounting element wall in a second axial direction opposite said first axial direction from along a second side of said flange portion.

4. A gas spring and damper assembly according to claim 3, wherein said second plurality of recesses are disposed in peripherally-spaced relation to one another about said axis along said second side of said flange portion.

5. A gas spring and damper assembly according to claim 4, wherein said first and second pluralities of recesses are oriented relative to one another along said flange portion such that each recess of said second plurality of recesses is disposed between adjacent ones of said first plurality of recesses relative to one another about said axis.

6. A gas spring and damper assembly according to claim 1, wherein said end mount assembly includes a plurality of bushing elements disposed in peripherally-spaced relation to one another about said longitudinal axis.

7. A gas spring and damper assembly comprising:
a gas spring including:
a flexible spring member having a longitudinal axis and including a flexible wall extending longitudinally between first and second ends and peripherally about said axis to at least partially define a spring chamber;
a first end member operatively secured to said first end of said flexible spring member such that a substantially fluid-tight seal is formed therebetween; and,
a second end member disposed in spaced relation to said first end member and operatively secured to said second end of said flexible spring member such that a substantially fluid-tight seal is formed therebetween;
a damper assembly operative to dissipate kinetic energy acting on said gas spring, said damper assembly including a damper housing operatively connected to said second end member and a damper rod assembly operatively engaged with said damper housing for reciprocal motion relative thereto, said damper rod assembly including an elongated damper rod; and,
an end mount assembly operatively connecting said elongated damper rod and said first end member and permitting said first and second end members to move at least one of laterally and angularly with respect to one another during extension and compression of said gas spring and damper assembly with said end mount assembly including a first plurality of bushing elements disposed in peripherally-spaced relation to one another about said longitudinal axis.

8. A gas spring and damper assembly according to claim 7, wherein said end mount assembly includes an inner mounting element with a mounting element wall that includes a connector portion dimensioned for operative securement to said elongated damper rod and a flange portion extending radially outward from along said connector portion.

9. A gas spring and damper assembly according to claim 8, wherein said flange portion has a first side disposed toward said connector portion and a second side facing away from said connector portion and with said inner mounting element oriented within said spring chamber with said first side facing away from said second end member and said second side facing toward said second end member.

10. A gas spring and damper assembly according to claim 7, wherein two or more of said first plurality of bushing elements are operatively connected with one another.

11. A gas spring and damper assembly according to claim 7, wherein said end mount assembly includes a second plurality of bushing elements disposed in axially-spaced relation to said first plurality of bushing elements and oriented peripherally about said axis in offset relation to said first plurality of bushing elements such that each bushing element of said second plurality of bushing elements is aligned between adjacent ones of said first plurality of bushing elements.

12. A gas spring and damper assembly according to claim 7, wherein said end mount assembly includes a third plurality of bushing elements that are different from said first and second pluralities of bushing elements with said third plurality of bushing elements disposed in peripherally-spaced relation to one another and positioned radially-inward and axially co-extensive with said first plurality of bushing elements.

13. A gas spring and damper assembly comprising:
a gas spring including:
a flexible spring member having a longitudinal axis and including a flexible wall extending longitudinally between first and second ends and peripherally about said axis to at least partially define a spring chamber;
a first end member operatively secured to said first end of said flexible spring member such that a substantially fluid-tight seal is formed therebetween; and
a second end member disposed in spaced relation to said first end member and operatively secured to said second end of said flexible spring member such that a substantially fluid-tight seal is formed therebetween;
a damper assembly operative to dissipate kinetic energy acting on said gas spring, said damper assembly including a damper housing operatively connected to said second end member and a damper rod assembly operatively engaged with said damper housing for reciprocal motion relative thereto, said damper rod assembly including an elongated damper rod; and,
an end mount assembly operatively connecting said elongated damper rod and said first end member and permitting said first and second end members to move at least one of laterally and angularly with respect to one another during extension and compression of said gas spring and damper assembly, said end mount assembly including:
a mounting bracket secured to said first end member, said mounting bracket including a bracket wall including a mounting wall portion, an end wall portion offset from said mounting wall portion and a side wall portion extending between and operatively connecting said mounting wall portion and said end wall portion, said bracket wall at least partially defining a mounting cavity that is at least partially formed by said end wall portion and said side wall portion;
an inner mounting element at least partially disposed within said mounting cavity, said inner mounting element including a mounting element wall that includes a connector portion dimensioned for operative securement to said elongated damper rod and a flange portion extending radially outward from along said connector portion, said flange portion having a first side disposed toward said end wall portion of said bracket wall and a second side facing toward said first end member;
a first plurality of bushing elements disposed in peripherally-spaced relation to one another along said first side of said flange portion; and,
a second plurality of bushing elements disposed in peripherally-spaced relation to one another along said second side of said flange portion.

14. A gas spring and damper assembly according to claim 13, wherein said inner mounting element includes a first plurality of recesses extending into said mounting element wall from along said first side of said flange portion with said first plurality of recesses dimensioned to at least partially receive one of said first plurality of bushing elements.

15. A gas spring and damper assembly according to claim 14, wherein said inner mounting element includes a second plurality of recesses extending into said mounting element wall from along said second side of said flange portion with said second plurality of recesses dimensioned to at least partially receive one of said second plurality of bushing elements.

16. A gas spring and damper assembly according to claim 13, wherein said end mount assembly includes a third plurality of bushing elements that are different from said first and second pluralities of bushing elements with said third plurality of bushing elements disposed in peripherally-spaced relation to one another and positioned radially-inward and axially co-extensive with said first plurality of bushing elements.

17. An end mount assembly dimensioned to operatively secure an associated damping rod to an associated end member of an associated gas spring and damper assembly, said end mount assembly comprising:
   a mounting bracket dimensioned for securement to the associated end member, said mounting bracket including a bracket wall including a mounting wall portion, an end wall portion offset from said mounting wall portion and a side wall portion extending between and operatively connecting said mounting wall portion and said end wall portion, said bracket wall at least partially defining a mounting cavity that is at least partially formed by said end wall portion and said side wall portion;
   an inner mounting element at least partially disposed within said mounting cavity, said inner mounting element including a mounting element wall that includes a connector portion dimensioned for operative securement to the associated damping rod and a flange portion extending radially outward from along said connector portion, said flange portion having a first side disposed toward said end wall portion of said bracket wall and a second side facing toward said first end member;
   a first plurality of bushing elements disposed in peripherally-spaced relation to one another along said first side of said flange portion; and,
   a second plurality of bushing elements disposed in peripherally-spaced relation to one another along said second side of said flange portion.

18. An end mount assembly according to claim 17, wherein said inner mounting element includes a first plurality of recesses extending into said mounting element wall from along said first side of said flange portion with said first plurality of recesses dimensioned to at least partially receive one of said first plurality of bushing elements.

19. An end mount assembly according to claim 18, wherein said inner mounting element includes a second plurality of recesses extending into said mounting element wall from along said second side of said flange portion with said second plurality of recesses dimensioned to at least partially receive one of said second plurality of bushing elements.

20. An end mount assembly according to claim 17, wherein said end mount assembly includes a third plurality of bushing elements that are different from said first and second pluralities of bushing elements with said third plurality of bushing elements disposed in peripherally-spaced relation to one another and positioned radially-inward and axially co-extensive with said first plurality of bushing elements.

* * * * *